(12) United States Patent
Smith, Jr.

(10) Patent No.: US 9,857,810 B2
(45) Date of Patent: Jan. 2, 2018

(54) SOLAR ENERGY SPACE HEATING THERMOSTATIC CONTROLLER

(71) Applicant: Clyde Wesley Smith, Jr., Hesperia, CA (US)

(72) Inventor: Clyde Wesley Smith, Jr., Hesperia, CA (US)

( * ) Notice: Subject to any disclaimer, the term of this patent is extended or adjusted under 35 U.S.C. 154(b) by 0 days.

(21) Appl. No.: 15/158,170

(22) Filed: May 18, 2016

(65) Prior Publication Data

US 2017/0336815 A1    Nov. 23, 2017

(51) Int. Cl.
| | |
|---|---|
| *F24D 19/10* | (2006.01) |
| *G05D 23/27* | (2006.01) |
| *F24J 2/40* | (2006.01) |
| *F24D 5/00* | (2006.01) |
| *G05D 23/19* | (2006.01) |
| *G05B 15/02* | (2006.01) |
| *F24F 11/00* | (2006.01) |

(52) U.S. Cl.
CPC ............ *G05D 23/27* (2013.01); *F24D 5/005* (2013.01); *F24D 19/109* (2013.01); *F24F 11/0012* (2013.01); *F24J 2/402* (2013.01); *G05B 15/02* (2013.01); *G05D 23/1917* (2013.01); *F24F 11/006* (2013.01)

(58) Field of Classification Search
CPC .... G05D 23/1924; G05D 23/24; G05D 23/27; G05D 23/1917; Y02E 10/40; F24J 2/402; F24D 5/005; F24D 19/109; G05B 15/02; F24F 11/0012; F24F 11/006
See application file for complete search history.

(56) References Cited

U.S. PATENT DOCUMENTS

| | | |
|---|---|---|
| 3,998,207 A | 12/1976 | Watt |
| 4,017,028 A | 4/1977 | Manor |
| 4,050,195 A | 11/1977 | Rapp, Jr. et al. |
| 4,116,219 A | 9/1978 | Nurnberg |
| 4,125,107 A | 11/1978 | Nurnberg |

(Continued)

OTHER PUBLICATIONS

16th Annual Independent Inventors Conference; Aug. 15-16, 2014; USPTO, Alexandria VA; Advanced Claim Drafting.*

(Continued)

*Primary Examiner* — Michael C Zarroli

(57) ABSTRACT

A solar energy thermostatic controller using a solid-state microcomputer that manages air mover(s) to supply heated air for building space heating. Methods includes microcomputer software for communicating with temperature sensors located at the solar heating source, the supply vent source and the building room/interior. The present invention thermostatic control device features a data logger to record temperatures and humidity history, and elapsed time usage history of solar heated air available from attics and crawl spaces; or solar collectors mounted in or on walls, rooftops, or exterior locations. The thermostatic control device manages use of limited solar heated air for building environmental control. Program controlled temperature set points manage an HVAC blower to gather solar heated air during the daily sunlight solar excursion and to control shutdown of the supply system when solar heated air temperature falls below present room/interior temperature. Methods include permanent memory storage of historical data.

13 Claims, 11 Drawing Sheets

(56) References Cited

U.S. PATENT DOCUMENTS

| | | | |
|---|---|---|---|
| 4,184,635 A | 1/1980 | Bloomfield | |
| 4,195,621 A | 4/1980 | Firebaugh | |
| 4,313,419 A | 2/1982 | Lyon et al. | |
| 4,442,444 A | 4/1984 | Osaka | |
| 4,494,526 A | 1/1985 | Wurst et al. | |
| 5,206,819 A | 4/1993 | Illing | |
| 5,224,649 A | 7/1993 | Brown et al. | |
| 5,236,477 A | 8/1993 | Koketsu | |
| 6,814,299 B1 | 11/2004 | Carey | |
| 6,824,069 B2 | 11/2004 | Rosen | |
| 8,091,795 B1 | 1/2012 | McLellan et al. | |
| 8,532,808 B2 | 9/2013 | Drees et al. | |
| 8,660,708 B2* | 2/2014 | Narayanamurthy | F24F 5/0046 236/1 B |
| 9,108,489 B2 | 8/2015 | Thorson et al. | |
| 9,115,908 B2 | 8/2015 | Shetty et al. | |
| 9,188,994 B2* | 11/2015 | Steinberg | G05D 23/1923 |
| 9,240,111 B2* | 1/2016 | Scott | G05B 15/02 |
| 9,269,108 B2* | 2/2016 | Chassin | G06Q 40/00 |
| 9,582,011 B2* | 2/2017 | Potter | G05D 23/19 |
| 2008/0277488 A1* | 11/2008 | Cockerill | F23N 5/203 236/46 R |
| 2009/0140057 A1* | 6/2009 | Leen | F24F 11/006 236/49.3 |
| 2011/0006887 A1* | 1/2011 | Shaull | G05B 15/02 340/12.37 |
| 2011/0041833 A1 | 2/2011 | Blevens | |
| 2011/0257795 A1* | 10/2011 | Narayanamurthy | F24F 5/0046 700/277 |
| 2013/0073094 A1* | 3/2013 | Knapton | F24F 11/0034 700/278 |
| 2013/0338837 A1* | 12/2013 | Hublou | G05D 23/1923 700/278 |
| 2014/0202449 A1* | 7/2014 | Snyder | F24F 5/0035 126/714 |
| 2014/0262196 A1* | 9/2014 | Frank | F24F 11/0012 165/251 |
| 2017/0059187 A1* | 3/2017 | Smith, Jr. | F24D 19/109 |

OTHER PUBLICATIONS

U.S. Department of Energy [DOE], Energy.gov, 'Solar Energy Potential (maps)'. [online]. [retrieved on Jul. 22, 2015]. Retrieved from the Internet <URL: http://energy.gov/maps/.

Weather Underground, 'Weather Station KCAHESPE8, Weather History, data of Oct. 29, 2014 through Nov. 15, 2014'. [online]. [retrieved on May 9, 2016]. Retrieved from the Internet <URL:http://www.wunderground.com/personal-weather-station/dashboard?ID=KCAHESPE8#history/s20141029/e20141115/mcustom>.

* cited by examiner

FIG. 5A

```
SET TEMPERATURE FOR
SOLAR, ROOM, and
    DIFFERENTIALS
Wait for instruction
```

```
  -Take action for-
TEMPERATURE SETTINGS
   Press Dial Down
-Hold for 5 seconds-
```

FIG. 6

```
-Differential Sets-
SOLAR      ROOM      VENT
  3          2         3
INTERVAL MIN'S:15
```

```
ON <SOLAR   ROOM    VENT
NOW:  84     70      80
SET:  68     73      83
RUN:  71 Humidity:26%
```

FIG. 7

```
TO CHANGE DATE/TIME
Use the Clock Dial
Push Dial 5 Seconds
Follow Instructions
```

```
NOW: 4/19/2016   12:53
   --Set Hour Now--
  -Slowly turn dial-
Push down when done
```

```
NOW: 4/19/2016   12:53
Hour is set to:12

11<<-Dial Change
```

```
SOLAR USAGE HISTORY
Hours & Temperature
-since installation
Your History Follows
```

```
Hours Run:  11263.12
Solar Avg Temp:  84.3
Humidity:  27.4%
Vent Avg Temp:  80.1
```

SOLAR ENERGY SPACE HEATING THERMOSTATIC CONTROLLER

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

FIELD OF THE INVENTION

The present disclosure generally relates to a building structure solar heating system in particular to methods and apparatus employing 'heating and air conditioning' (HVAC) components to transport heated air derived from solar insolation. Solar insolation provides the primary heat source for solar heated air collected in apparatus located on a roof, in an attic, on a wall or other exterior location, such apparatus used for purpose of space heating. Operation of heating appliances require thermostatic control apparatus to manage building structure environmental needs. The technology for methods and apparatus of the present invention disclosure relates to managing the use of solar heated air of sufficient temperature for space heating with such heated air supplied through HVAC ducts to the building interior.

Prior art uses of solar energy as a fuel for space heating has been developed over many years in a variety of apparatus and methods including passive use of solar energy incorporated in building architectural features, and active use of solar energy employed in manufactured solar heat collection apparatus. Solar insolation can contribute to heating air usable for space heating when gathered by apparatus in the form of solar collectors to work in conjunction with heat exchangers that transmit heat energy via air movers, or water for space heating employing a radiator located within a building interior. Btu (British Thermal Units) hereinafter expressed as Btu/h (Btu per hour) and Btu (describing singular or plural), is the primary measurement method used for heat energy in the United States HVAC industry as applied to space heating apparatus.

Traditional HVAC systems generally produce sufficient Btu measure for economical and efficient space heating by design. However, continued improvements of HVAC systems are being encouraged through government mandate to promote energy efficiency. Common heating fuels used in traditional space heating systems are natural gas, propane, coal, electricity, steam, and wood, each of which have known Btu measure output. Natural heat from the sun also produces quantifiable heat in the form of Btu measure suitable as a fuel source for space heating.

HVAC industry principles are widely known as a vital contributor to human comfort. A building structure utilizes heating, ventilating, and air conditioning HVAC systems for environmental comfort. HVAC systems comprise air conditioners, coolers, furnaces, air filters, and heat exchangers to gather outside air for heating or cooling using such system components that include HVAC ducts and vents/diffusers (aka: register vents). Various HVAC technologies include air movers that operate by methods of constant velocity, velocity reduction and equal friction. Artificial means of producing heat energy is the major method used in HVAC space heating systems.

Use of solar heat energy for space heating has yielded to that of artificial heating devices due to uncertainty of atmospheric conditions and weather cycle that may affect the sun's energy to provide a consistent and useful amount of heat. Sufficient solar energy for heating purposes is generally available only in certain geographic regions. Solar energy for heating, referred to as solar insolation (solar radiation relative to heating), has for many years been measured by instruments in various geographic locations on earth with the intent to promote such solar energy as a source for optimum use primarily to heat domestic water and swimming pools. It is therefore necessary to isolate solar energy as a source of heat using solar energy mapping for specific geographic locations (solar zones) that can best take advantage of such heat for space heating to the fullest extent possible. Solar maps illustrating solar energy potential by geographic region are available from a variety of publishing sources including that of the U.S. Department of Energy ([1]U.S. Department of Energy [DOE], 2015).

Use of solar heated air gathered for use within a building interior for space heating has been the subject of a number of U.S. patents that disclose a variety of apparatus and methods using novel building structural designs or unique apparatus as collection devices to harness solar insolation within said devices. The amount of solar energy available for space heating has significant energy savings potential for which the present invention thermostatic controller addresses apparatus and methods to manage the collection of solar heat and to make efficient use of such heat for space heating.

BACKGROUND OF THE INVENTION

Current solar energy thermostatic devices use methods involving temperature control set points (temperature references), and hysteresis (also referred to as differential temperature adjustment), to manage the use of solar generated heat. Thermostatic controllers, referred to as 'on-off' thermostatic regulators, are widely used to manage the supply of solar energy apparatus, particularly those that heat water for domestic use or to heat swimming pools. On-off regulators require temperature sensors located at the heating source as well as the supply side of the collector to regulate the flow of heated liquid based on a temperature set point and hysteresis (differential) temperature setting to control operation of the solar heating apparatus. The design of solar water heating temperature regulators focuses on excessive strain of pump motors due to constant activation and deactivation. Air mover devices (fans and blowers) for transporting solar heated air do not normally experience significant strain during operation. In solar water heating applications, temperature sensors communicate with electronic equipment to control a water pump by halting the pump motor whenever the sensed temperature drops below a reference 'set-point' temperature, resulting in starting the pump when temperature exceeds the temperature set point. The set-point temperature may be a directly dependent solar heating system parameter established by the user or a default setting for temperature maximum or minimum value. Examples of typical on-off regulators include U.S. Patents as follows.

Watt, U.S. Pat. No. 3,998,207 (December 1976) discloses an integrated circuit dc-comparator (a direct current voltage signal device), to control a solar water heating system for sump water and collector water temperatures such that the pump motor is deactivated when temperature exceeds a certain limit while also comparing the difference between the sump water and collector water temperatures.

Manor, U.S. Pat. No. 4,017,028 (April 1977) discloses a temperature differential sensing and control device utilizing a flexible diaphragm in contact with different regions of fluids monitored for temperature relationship resulting in the diaphragm actuating a switch to modulate and manage flow of such fluids.

Rapp, Jr. et al., U.S. Pat. No. 4,060,195 (November 1977) discloses a solar heating system circuit incorporating a solar collector, a heating load, and a heat transfer controller, including a collector valve or damper for managing the flow of heating fluid to and from the solar collector. The system incorporates a heat exchanger to accept fluid from a storage tank with the control circuit, including a load sensor, to determine temperature for purpose of switching flow of the heated fluid by actuating a heating pump.

Nurnberg, U.S. Pat. No. 4,116,219 (September 1978) discloses a differential thermostatic control, for solar heating of fluid in a solar collector and in the storage tank, for purpose of operating a pump motor. Such thermostatic control senses high and low extreme temperature to prevent excess pressure in the storage tank or freezing water in such tank.

Nurnberg, U.S. Pat. No. 4,125,107 (November 1978) discloses a universal differential thermostat for a solar heating system using a resistant bridge circuit containing connectivity as a differential comparator. Such comparator senses low-limit solar panel temperature and/or high-limit storage tank temperature for turning on or off the circulation pump or running cool water into the storage tank if necessary. Such thermostat senses a true reading of solar panel temperature through periodic operation of the water circulation pump.

Bloomfield, U.S. Pat. No. 4,184,635 (January 1980) discloses control units for heating systems utilizing a comparator device with sensors and circuitry in a cascade manner for primary and secondary sensing of temperature, where a plurality of heat stores are controlled. Differential temperature sensing with such device manages the transfer of heat from the collector to the corresponding store.

Firebaugh, U.S. Pat. No. 4,195,621 (April 1980) discloses a solid-state differential temperature regulator for a solar heating system. Such solid-state regulator has a control circuit response to temperature set point differences determined by the sensors to cause circulation of swimming pool water. A cut-off control activates valves to by-pass the solar heated water causing pool water to circulate back into the collector when temperature in the collector is lower than the pool water temperature, thus enabling cooling the pool water as a derivative operation.

Lyon et al., U.S. Pat. No. 4,313,419 (February 1982) discloses a solar heating system using a double storage device to increase efficiency and capacity over several days' operation. The system utilizes differential temperature controllers that are conventional and commercially available connected to the storage tanks to enable output from such temperature controllers to direct the flow of heated water for space heating and for domestic water heating. The system object is to provide apparent tank temperature stratification and minimum collector temperature for increased collection efficiency.

Webb, Jr., U.S. Pat. No. 4,422,444 (December 1983) discloses a solar energy control system and method for efficient use of heat produced from solar energy heating of air and/or water. Such system and methods directs heat from a solar collector to a water heater, which disperses heat into a monitored room to heat the air. When reaching the preselected temperature, the system redirects heat to water inside the water heater for reuse in heating the air in the room when required. The system provides visual display of the indicated temperature using improved probes to sense air, water and collector temperature Wurst et al., U.S. Pat. No. 4,494,526 (January 1985) discloses a temperature sensing system for measuring differential temperature using temperature sensors placed on first and second legs of a bridge circuit. The disclosure claims three temperature sensors for solar radiation on a collector, ambient air temperature, and temperature in the fluid storage area. Using results of temperature sensing, causes a control signal to enable transfer of thermal energy by circulating fluid between the collector and storage area resulting from a comparator response to such signal.

Illing, U.S. Pat. No. 5,206,819 (April 1993) discloses a control system for a solar heater including solar collectors and a reservoir. The temperature sensor of the controller has a memory element to make periodic adjustments based on temperature and sunlight intensity. The sensor signal drifts along an equilibrium curve to enable an electronic output from the sensors to determine if the solar collectors can gain or lose heat. The device primary use is for solar water heating. The system utilizes a microcomputer to collect sensor data, store the results and evaluate the data to implement control by sending a signal to transistor hardware that operates the water pump.

Blevins, U.S. Patent Publication No. 2011/0041833 A1 (February 2011) discloses a solar heat exchanger controller used for pre-heating to support a heat pump heating system, in an air-to-air heat exchanger using solar heated fluid. The controller connects electrically to the thermostat of a conventional heating system. The controller locks out the conventional heating system operation when the solar heat is sufficient. The solar heat exchanger warms a liquid solution introducing such solution into thermal contact with saturated vapor to let refrigerant extract more heat at low ambient temperatures, allowing an air-to-air heat pump to produce its designed heating ability at lower temperatures.

The referenced U.S. Patents above reflect a common objective to enable sensing of temperatures of solar heating apparatus for purpose to manage direction of solar heated fluids through tanks or heat exchangers of the designed task including that for space heating modalities, swimming pool water heating, and domestic water heating.

The following referenced U.S. Patents are for devices that perform thermostatic functions used in traditional HVAC environmental control apparatus employing microcomputers and specialized electronic methodology within prior art modality. Such devices offer precision control of such thermostatic functions similar to the present invention thermostatic controller technology. Prior art thermostat technology includes a range of modes from elementary to elaborate in their device operating features. Many prior art devices reference improvements that allow users to perform thermostatic control functions expeditiously including ease of set point changes and for managing specialized programs that include daytime and calendar driven on-off control of the space heating operation. Many of the following patents disclose that such designs are 'user friendly' while some of the designs have introduced forms of intuitive thermostatic control based on a number of factors such as sleep schedules of the occupants and outside weather patterns.

Brown et al., U.S. Pat. No. 5,224,649, (July 1993) discloses a digital thermostat with single rotary encoder switch for establishing set point. The thermostat uses the encoder rotatable knob in a plurality of discrete angular positions each of which enables the switch to signal increments for purpose to change said set point of the thermostat. The encoder has temperature values imprinted on the dial for visual display through a window of the thermostat cover indicating the temperature settings from 40° F. to 90° F.

Koketsu, U.S. Pat. No. 5,236,477, (August 1993) discloses a microcomputer-based control device using non-volatile memory to store operating time of an air-conditioning control unit and power supply. The non-volatile memory overcomes issues with volatile memory types by preserving data when power disrupts. Such data includes processing information and predetermined instructions while also recording historical equipment operation time for purpose to determine time of replacement of the air filter. The device includes a DC power supply section for converting AC power to DC voltage to manage power control of fans and filter changing equipment.

Carey, U.S. Pat. No. 6,814,299 B1, (November 2004) discloses a thermostat with a one button programming feature using an LCD display and adjustment button pressed once for setback of selected temperature setting during a predetermined setback time. The device features automating date/time synchronized from the national weather broadcast station WWVB to eliminate the need for user change. The device utilizes automatic setting features preprogrammed and accessible by the user through the one button initiation directive to perform a variety of program instructions to the thermostat to fit household living habits.

Rosen, U.S. Pat. No. 6,824,069 B2 (November 2004) discloses a programmable thermostat system employing a touch screen unit for intuitive interactive interface. Such device uses a transparent touch pad over a liquid crystal display as the user interface for managing the system, which includes temperature sensor, real time clock, a central processing unit (CPU), memory coupled to the CPU for storing program and data information. The display touch screen provides for menu messages to explain function buttons and icon indicators to facility intuitive programming by the user.

McLellan et al., U.S. Pat. No. 8,091,795 B1 (January 2012) discloses an intelligent thermostat device employing an automatic adaptable energy conversation process based on real-time energy pricing. Such device displays energy demand relative to fluctuations in utility company energy prices, and then notifies the user of such fluctuations. Changes in energy pricing produces a response by such device to adjust current temperature set point by a setback based on such pricing. The device also simulates a utility meter showing the real-time energy demand. The device includes sophisticated programming for user mode selections, temperature input, and the operation of complex HVAC equipment through its energy management features.

Drees et al., U.S. Pat. No. 8,532,808 B2 (September 2013) discloses systems and methods for measuring and verifying energy savings in buildings. Such system enables historical data collected during operation for interpretation by a processing circuit to perform regression analysis of such data variables to model and predict energy usage of a building. The data processing includes weather and utility meter input which results in predictive management, including such items as baseline for heating degree-days and cooling degree-days, to help improve modeling.

Thorson et al., U.S. Pat. No. 9,108,489 B2 (August 2015) discloses a display apparatus and method having a tabbed user interface for an environmental control system. The device design focuses on the complexity of HVAC systems requiring programming and display of information such that using a tabbed presentation readout enables user flexibility to govern HVAC control with a touchscreen input device and display providing a wide range of information, including control parameters, in an organized manner. The device features significant display variables for heating and cooling with access through such tabbed selection system provided by computer programming Shetty et al., U.S. Pat. No. 9,115,908 B2, (August 2015) discloses systems and methods for managing a programmable thermostat. The devices contains a management profile to include a data acquisition and data analysis subsystem that works in conjunction with user programmed settings to eliminate waste of energy. User input includes a wide assortment of program parameters for temperature set point, sensing of relay states, and season/date/time oriented parameters (day, wake, away, return, and sleep, for example). The data acquisition mode includes acquiring energy usage from a utility company.

Technical Problem

Traditional heating methods use HVAC thermostats to control output for space heating including thermostats that regulates on-off status relative to the user's requirement. The traditional heat source, being fossil fuels or derivatives such as electricity generated by natural gas or coal, provide known output in Btu measure of heat from a furnace or stove. Commercial buildings often employ sophisticated thermostats that include differential temperature settings to provide uniform mixing of heated air on a zonal basis with that of the present interior air by adjusting the specific volume of heated air supplied to the building room/interior. Heat consumption in residential single family and multifamily buildings, as well as small commercial buildings generally do not employ sophisticated commercial thermostatic devices, although manufacturers do provide simpler smart sensing capabilities for such markets in their modern electronic thermostatic devices.

Generally, artificial heating systems use HVAC components such as bimetal thermostats or digital thermostatic temperature control devices for space heating efficiency. However, thermostatic control apparatus for solar energy 'space heating' is not widely available in commerce while solar space heating, as an alternative, is not as popular with majority of consumers due to lack of knowledge or experience. Solar air heaters currently on the market require thermostats to control on-off state by temperature sensing of heat level inside the solar collector similar to an attic ventilator fan responding to heat increase. Such solar air heaters use a specific temperature set point to start and a differential temperature setting to stop (based on pre-set start temperature); a thermostat is often built-in with preset temperature range maximum and minimum setting inherent to the operation of window mount units, for example.

Solar energy thermostatic controllers whether for heating air or water generally do not provide real-time monitoring (data logging) for calculation of heating cost savings. To know the effectiveness of a solar heating device, the user must rely on general comparison of heating cost incurred from prior use of traditional forms of heating compared to heating cost after installation of the solar energy apparatus in order to calculate savings; with seasonal climate effect the results may be imprecise. Solar space heating devices also have limited performance accountability of heating cost savings in claims made by manufacturers of such apparatus. Such accountability is a technical problem associated with solar heat collectors when there is no ability to obtain Btu measure to calculate energy cost savings, and without real time monitoring for measurement of temperature, relative humidity, and airflow volume. Additionally, solar economic savings calculation becomes problematic when considering seasonal variations in weather. A typical user cannot afford expensive data gathering equipment such as the highly sophisticated data collection devices used for feasibility studies and research projects. Present art apparatus and methodology should require some form of real time or incremental monitoring of heat, however, any monitoring method must be affordable for the ordinary consumer. Solar space heating Btu measurement requires data logging of temperature and humidity, without which if analysis is unavailable, results in difficulty for the consumer when required to make adjustments to manage operation of the space heating system in place for cost savings benefit.

Solution to the Problem

The present invention incorporates a solid-state microprocessor for routine temperature measurement to manage a single blower (air mover), or a plurality of blowers, as part of a solar energy sourced 'closed loop' space heating system necessary for environmental comfort inside a building structure. Temperature control of space heating requires parameters ('set-point' or reference temperature, and hysteresis/differential temperature settings) for each of three specific temperature elements used in space heating: the solar source temperature, the HVAC system supplied temperature (at the vent outlet leading into the interior), and the room/interior temperature. Hysteresis (temperature differential, also referred to as 'swing') employs within the present invention to efficiently control 'start-up' temperature, 'operating' temperature and 'room/interior' temperature to make best use of limited solar source heat provided daily, all while controlling the HVAC system on-off status. The present invention thermostatic controller manages solar energy space heating, as a supplement to artificial heating, in most geographical areas where solar insolation is plentiful. The geographic areas known for suitability of solar energy space heating can expand to some of the more northerly zones experiencing longer heating seasons with the use of the present invention coupled with appropriate solar heating collectors including that of a building attic area. Various solar energy collection modality include attics, roof or wall mounted collectors, window mounted collectors, or apparatus and/or architectural features integrated into buildings that can harness solar heat energy or 'waste' heat. The demand for solar energy used for space heating involves use of an HVAC blower starting in late morning when solar insolation elevates until such solar insolation lowers later in the afternoon. The present invention thermostatic controller performs a function to reduce frequent start and stop activity of air movers by control of an 'on-off' relay for starting or stopping a blower during user established pre-set time intervals of 5 minutes up to 60 minutes in length. Such timed interval is appropriate for solar collector systems where solar heat excursions occur gradually over the sunlight hours. Some high efficiency solar heated air collectors may require adjustment to a short interval depending on solar temperature excursion rise throughout the sunlit hours, as well as depending on the HVAC system design for supplying the collected heat if not using plenums or multiple ducts. Engaging an air mover for purpose of supplying solar heated air for space heating does not present the same concerns for stress or strain common to water pump motors used for solar water heating systems.

The present invention microcomputer has software programming flexibility to enable customized program logic for real time temperature sensing response within seconds that would emulate a normal thermostat when the user requires such response. Such flexible programming can involve program logic that activates the relay when sensing temperatures in real time while such temperatures meet the set points moderated by the hysteresis settings. Such programming allows for accelerated interval loops, while also utilizing a real time clock (RTC) as the timing mechanism to control the interval established by the user for purposes of data logging. The present invention microcomputer's software program capability allows the user to have operational control accommodated through pre-programmed instructional display menus to include parameter settings placed conveniently during the system processing cycle for added flexibility and enablement. Additionally, the instructional liquid crystal display (monitor) menus substitute for a printed user reference manual, as such instructions guide the user through necessary steps required to set control parameters and date/time (for data logging).

The present invention methods include data collection that enables calculating Btu measure contained in the solar heated air at varying temperature and relative humidity levels. Such calculation methods provide information for control and management of the space heating system in order to optimize retention of the solar heat resource from the selected solar heat collection apparatus. The apparatus and methods employed along with the simplicity of the thermostatic controller of the present invention demonstrates effectiveness for space heating when providing original or supplemental heat compared to that of traditional heating methods.

Scalability of the present invention allows for unrestricted design options of the HVAC duct network and air handler(s) to enable sufficient airflow capacity for space heating as required, therefore addressing small to large building structures that have suitable locations for solar heated air collection apparatus. The present invention microcomputer controller has ability to connect with a wide range of air mover electric load factors (both AC and DC), and a variety of on-off relay types required to control various capacities of air movers whether a single air mover or a plurality of air movers in series. The present invention thermostatic controller can manage a separate building zone, cost effectively, when utilizing the limited solar heated air emanating from the solar heat collector. The present invention placed in a central location within the building interior structure can operate without concern for the location of temperature sensors as such sensors can be strategically placed, and may be relocated within any area that best serves to manage the interior temperature using the solar heated air supplied.

Heated air from a solar collector or attic must be at a usable temperature for space heating when mixed with the colder interior air. The Btu measure in the heated air of a solar collector, attic, or upper crawl space of a building structure can be determined using the thermodynamic variable 'enthalpy'. Enthalpy is a heat measure expressed as Btu per pound of air taking into account the thermal variables of altitude, relative humidity, and temperature, based on air density at the location. The science of thermodynamics associates with principles of psychrometrics relates to heat influencing water vapor and air. Thermodynamic principles employ a psychrometric chart that includes enthalpy as a variable that changes with the dynamics of the other aforementioned specific thermodynamic variables. Such psychometric chart provides the primary metrics for use by HVAC professionals involving heating system installations. The present invention generates the data information elements for logging temperature and humidity during its operation and records such data for psychrometrics analysis when knowing the altitude of the building structure and the volume of air passing through the air mover as it gathers the solar heated air during operation.

In summary, the present invention thermostatic controller enablement features include specialized methodology that incorporates a software programmed microcomputer or similar programmable digital computer device format to manage a solar space heating system efficiently. The present invention provides collection of historical usage data for interpretation by computer program applications (apps) and worksheet (spreadsheet) computations, as well as manual computation methods. The methods and apparatus coupled with the consumer known and/or logged solar heated air temperature data also contributes to feasibility and evaluation of the present invention space heating performance prior to installation.

SUMMARY OF THE INVENTION

Advantageous Effects of Invention

The present invention thermostatic controller purpose of managing operation of solar energy space heating requires establishment of temperature parameter set points (reference temperature) for system start-up when solar heated air temperature is higher than that demanded from the interior thermostatic setting, while the interior temperature is lower. Interior comfort for humans requires a temperature set point usually ranging from 20 to 23.9° C. (68 to 75° F.) during heating season. To manage solar source heat temperature as supplied for interior comfort, the present invention thermostatic controller uniquely employs temperature sensing of the solar heat source and the building interior while introducing a third location for temperature sensing and control at the heated air supply vent (diffuser) while such heated air enters the building interior from the solar heat source.

The present invention incorporates a microprocessor that receives signals from remotely located sensors to transmit temperature/humidity, or temperature only, for programmed control. Hard-wired temperature sensors are preferred for being economical because of their simplicity, their durability, are easily locatable/relocatable, and require no batteries to operate or to replace when power is exhausted. Alternatively, battery powered remote temperature sensors using wireless modality adapted to the microprocessor is an option within the present invention capability for operating on wireless peripheral Protocol with minimal software programming.

The signaling method to the microprocessor from the remote sensors is either by analog or digital electronic signal communication. User set points and hysteresis/differential temperature values control the present invention for solar heating with the microprocessor thermostatic controller activating the blower motor, thus providing for efficient use of the limited solar insolation throughout the sunlight hours of the day. The present invention thermostatic controller incorporates hysteresis/differential degree settings to provide temperature range management upon having processed the temperature sensor signals while it manages the environmental control for space heating. The differential temperature settings establish a range of temperature high set point or low set point. Such differential degrees effect the programmed transition in the microcomputer controller to react to the actual temperature change measured against the differential degree swing value relative to the each of the three temperature sensor values. Increase or decrease in temperatures signals results in a response from the microcomputer program to set a relay on or off for control of the air mover (blower motor). The microprocessor computer program utilizes the temperature readings of each of three sensors for solar source, vent/diffuser, and room/interior to enable more precision in the utilization of limited daily solar source heat.

Advantages of the present invention apparatus, its methods, disclosures and claims must first take into account the variability of solar performance for the given geographic location of the building structure. Solar insolation (solar heat energy or solar radiation) generates the 'heat source' for exchange within a solar air heating collector of either a specific manufactured solar collector, or a building attic/crawl-space that holds solar heat energy during the sunlight hours. The Btu measure within solar heated air is not consistent day to day due to weather variations and location. Measuring the space heating performance in an exact or finite nature is difficult compared to measuring performance of traditional heating appliances. The solar energy space heating system is able to utilize the solar generated heat only when it is available. Regardless of variation in solar energy availability, the performance advantages of the present invention are apparent as enumerated point by point in the following paragraphs.

The present invention thermostatic controller, being robust and scalable in its application, makes collaboration possible with mechanical HVAC devices such as heat exchangers or heat pump systems that extract heat from the solar heated air collectors (or attics) and for other duty such as heating domestic water. Additionally, the use of solar collectors, including transpired solar air collectors (TSAC) or similar apparatus mounted on a south facing wall during heating season in North America, for example, can enhance space heating when coupled with an attic for collecting solar heat therefore allowing two or more solar collection modalities to work in partnership. Flexibility within the present invention enables any available solar generated heated air to contribute toward energy cost savings by requiring less artificial heat.

Action of the present invention thermostatic controller ensures continuous use of available heat when sufficient solar insolation makes contact with a solar collector to create a usable air temperature. The solar collector may be the ceiling surface of an attic peak area where air contained therein contacts with such ceiling surface heated by solar insolation. If solar insolation were intermittent due to weather, the controller would stop and restart periodically at selected intervals as the solar source heated air temperature moves above or below the desired operating temperature controlling reference setting. The present invention thermostatic temperature controller manages efficient use of available Btu measure by allowing collection of useful heat energy when source solar heated air temperature is high enough to meet the interior temperature reference setting. The present invention ensures that a solar collector will supply solar heated air to the building interior when such temperature exceeds the interior temperature, or until such heated air temperature reaches the solar source stop set point to shut down the space heating system operation. Supply of solar heated air to a building interior using thermostatic temperature control enables a steady and continuous stream of such heated air throughout the sunlight hours. Solar heated air temperature increases substantially when solar heat is available usually over several hours, allowing consumption of the solar heat energy available to occur in a continuous manner using such thermostatic control. The present invention thermostatic controller manages the supply of solar heated air to increase and maintain an interior temperature level that avoids any discomfort to occupants or animals. The solar source heated air supply is managed in the building interior by the present invention thermostatic controller as follows:

(a) Starts operation based on set point when solar source heat temperature is suitable.
(b) Reacts to building interior temperature maximum to avoid overheating.
(c) Regulates the upper limit interior temperature setting to stop the space heating system.
(d) Matches the solar supplied air temperature to the present interior temperature level in late afternoon during transport into the building interior through the outlet vent to avoid colder air from entering said interior.
(e) Stops the operation based on set point when solar source heat temperature is no longer useful.

Commonly used measure of heat energy, as applied to HVAC systems, are methods of the present invention to quantify the Btu measure available in the solar heated air. The Btu measure can be reasonably determined from variables of temperature, relative humidity and altitude (air pressure effect) to compute the enthalpy variable value (heat energy as Btu per pound of air). Altitude affects the value of the specific volume of air due to air pressure difference. Enthalpy is the resultant thermodynamic variable that determines Btu of moist air measured in cubic feet flowing through the solar heated air collector. Such enthalpy value is divided by the specific volume of air (the cubic feet of air volume in a pound of air) to determine the Btu content in such volume of air. Adding the time factor relative to the Btu measure in air supplied and useful for space heating, enables determining the dollar value of such heat as compared to cost of alternative heating fuels supplying the same Btu measure in such comparison. The present invention methodology for determining Btu/h/ft$^3$ measure in the air during operation is to record the temperature and relative humidity using the present invention apparatus data logger in intervals (example: every fifteen (15) minutes) which is then posted to an SD digital storage memory card communicating with an SD writer. An interval of fifteen (15) minutes is preferred for reasonable accuracy and environmental control, whereas 30 minutes is also acceptable without significant degradation of data for analysis of the space heating system performance and investment return to the user. The present invention allows setting the interval at 5 minutes up to 60 minutes at the pleasure of the user. A short interval duration may be required when using solar collector devices producing extreme temperature rise to avoid an overheating condition. However, flexibility of custom software programming of the present invention allows for temperature stop controls using real-time sensing of such temperature extremes should the user require this. Nevertheless, the set points and differential settings of all temperature inputs, while associating with short duration intervals, likely would provide the required environmental control in the majority of applications upon consideration of the volume of heated air required to be moved by the blower(s). Temperature and usage data requires download periodically, or at the end of the heating season, to obtain the necessary data for analysis using a computer spreadsheet application associated with the present invention. Such computer application calculates the total Btu measure residing in the solar heated air during the solar space heating system hours of operation, which results in total heat energy value in Btu measure used for space heating. The computer application requires the air mover's rated CFM (airflow in cubic feet per minute) to determine heated air volume gathered during daily operation. The CFM airflow rate is required to calculate total Btu measure collected in such air volume based on interval data logging of the solar source air temperature during space heating system operation. The net CFM airflow rate varies with static pressure of the HVAC system caused by inefficiencies in the system duct network. Table 1 is an example calculation using the computer application devised for use with the present invention. Such application facilitates accounting for Btu measure supplied during system operation. The computer application includes the ability to calculate the total Btu measure from data gathered during periods of days, or weeks, or for the entire heating season.

Table 1 shows results of a computer program application supporting analysis of the data obtained from a portable digital data logger, which operates in the manner as the present invention by collecting temperature and humidity, at specific timed intervals. Table 1 presents Btu measure obtained from data logger readings of temperature and relative humidity levels at a test-building site during the 2014/15 heating season. The building is a gable roof single-family residence with 1760 sq. ft. living area, with its attic ventilation openings restricted to retain solar generated heat for space heating. The computer program uses HVAC industry psychrometric formulas to determine enthalpy (heat in Btu per pound of air) measured against the known cubic feet per pound of air (at a given altitude) to arrive at Btu per cubic foot volume of heated air available in the attic air space as averaged from two successive 30 minute intervals of data logging. A stream of logged temperature and relative humidity in intervals of 30 minutes provides data for the computer program for transfer onto a computer spreadsheet form. The computer program application is performed using parameters of: (1) the building location's altitude, (2) the starting temperature desired, (3) the stopping temperature desired, (4) the cubic feet per minute of blower airflow output, and (5) the selected date range of temperature and humidity recordings required for accumulation of the Btu measure to be calculated. The computer program processes the logged data, which calculates the average value of Btu measure obtained from the successive 30-minute intervals, and then applies the CFM rate of the blower (400 CFM airflow) during operation to calculate Btu measure from the data obtained during a selected range of dates. The blower output manufacturer's specification rating is 440 CFM at 0.2" static pressure (Table 1 uses 400 CFM estimate for calculation based on anemometer airflow tests). The computer program accumulates total Btu measure supplied by the blower using such selected parameters and the dates desired, printing the report as shown in Table 1. Table 1 selection is data logged during Oct. 29, 2014 through Nov.

15, 2014 to illustrate the function of the program application. The data shown for the selected days are: (1) the average of the highest temperature recorded in the attic; (2) the average temperature encountered in the attic during the actual hours of use; (3) the Btu daily average for the hours of use; (4) the total Btu measure generated; (5) the hours of operational use by the space heating system for each day. Historical outside weather temperature data was collected for purpose of reference to ambient temperatures from weather station KCAHESPE8, located within one (1) mile of the test building which is available on the Weather Underground website dashboard, showing weather station historical data referred to as the "Almanac" ([2]Weather Underground, 2016). While the temperature and humidity logging occurs during the heating season, the solar heating system gathers attic heated air for supply into the building determined by parameter criteria set points to start at 68° F. and stop at 72° F. The solar heating system's operational heat continues to rebuild in the attic through heat transfer of air when meeting the attic ceiling used as a solar collector (with air vents mostly covered). As the blower intakes solar heated air, such air movement promotes convection (the concept of 'air convection coefficient') within the attic to sustain effect of the solar insolation during sunlight hours. The temperature/humidity sensor was located about 15 inches below the peak area (distance from peak to attic floor is 5 feet), and fairly represents the temperature in the full volume of attic space logged to be within 1 to 2 degrees Fahrenheit, depending on solar conditions, as measured between the peak and floor of the attic. When sealing the attic from outside colder airflow, with air vents mostly covered, the temperature variance from peak to floor is minimal.

TABLE 1

Total Btu Available in Attic (Attic vents closed), Example Selected Dates (Year 2014)
Btu calculation from temperature, relative humidity (RH) logged to determine energy output. Btu average (Btu/cf AVG) per cubic foot is based on average of two successive logged entries in 30-minute intervals of temperature and relative humidity when temperature in the attic reached 68° F. with the space heating system off at 72° F. in the late afternoon. The logging occurred while the system is in operation drawing attic air. TEMP = ° F.

| DATE | HIGH TEMP | AVG TEMP | AVG RH % | Btu/cf AVG | Btu TOT | OPER HRS | LOG Count | AVG Exter. TEMP |
|---|---|---|---|---|---|---|---|---|
| Oct. 29, 2014 | 96.00 | 85.67 | 19.54 | 1.712 | 431,431 | 10.5 | 21 | 65.3 |
| Oct. 30, 2014 | 92.00 | 82.72 | 20.47 | 1.654 | 396,921 | 10.0 | 20 | 66.0 |
| Oct. 31, 2014 | 83.50 | 78.50 | 30.20 | 1.711 | 327,554 | 8.0 | 16 | 59.2 |
| Nov. 1, 2014 | .00 | .00 | .00 | .000 | 0 | .0 | 0 | 48.8 |
| Nov. 2, 2014 | 78.50 | 75.91 | 35.59 | 1.719 | 226,864 | 5.5 | 11 | 48.5 |
| Nov. 3, 2014 | 75.00 | 73.61 | 29.92 | 1.572 | 169,799 | 4.5 | 9 | 48.4 |
| Nov. 4, 2014 | 82.00 | 77.14 | 24.91 | 1.590 | 267,071 | 7.0 | 14 | 53.6 |
| Nov. 5, 2014 | 87.50 | 81.73 | 21.47 | 1.650 | 296,939 | 7.5 | 15 | 59.4 |
| Nov. 6, 2014 | 93.00 | 84.50 | 21.60 | 1.722 | 371,942 | 9.0 | 18 | 62.8 |
| Nov. 7, 2014 | 93.00 | 84.83 | 20.25 | 1.704 | 368,161 | 9.0 | 18 | 63.3 |
| Nov. 8, 2014 | 95.00 | 85.45 | 19.72 | 1.711 | 390,058 | 9.5 | 19 | 64.9 |
| Nov. 9, 2014 | 96.00 | 85.13 | 20.43 | 1.718 | 412,299 | 10.0 | 20 | 66.2 |
| Nov. 10, 2014 | 83.00 | 78.66 | 22.91 | 1.597 | 306,664 | 8.0 | 16 | 60.5 |
| Nov. 11, 2014 | 76.00 | 73.83 | 37.75 | 1.687 | 182,183 | 4.5 | 9 | 52.9 |
| Nov. 12, 2014 | 79.00 | 76.25 | 37.27 | 1.754 | 252,528 | 6.0 | 12 | 53.0 |
| Nov. 13, 2014 | 75.00 | 72.94 | 44.56 | 1.751 | 189,138 | 4.5 | 9 | 52.7 |
| Nov. 14, 2014 | 78.00 | 75.30 | 43.23 | 1.811 | 217,293 | 5.0 | 10 | 54.2 |
| Nov. 15, 2014 | 74.00 | 72.44 | 45.50 | 1.748 | 167,829 | 4.0 | 8 | 53.8 |
| Totals --> | | | | | 4,974,677 | 122 | 245 | |
| Avg All Days | 79.81 | 74.70 | 27.52 | 1.601 | 276,371 | 6.8 | 13.6 | 57.4 |
| Avg Days Used | 84.50 | 79.10 | 29.14 | 1.695 | 292,628 | 7.2 | 14.4 | 57.9 |

Legend: [Temperatures in Fahrenheit]
TEMP = Fahrenheit,
DATE = Recording date,
HIGH TEMP = Highest temperature in attic during the day
AVG TEMP = Average of all temperatures recorded between start and stop temperature selected
AVG RH = Average of all relative humidity levels recorded between start and stop temperature selected
Btu AVG = Calculation of enthalpy (Btu Measure) per cubic foot of heated attic air based on average temperature and relative humidity at an altitude of 3,374 feet.
Btu TOT = Total Btu Measure per cubic feet for all hours of operation based on the air mover (blower) volume constant volume airflow of 400 CFM as estimated.
OPER HRS = Operating hours for total intervals of 30 minutes (LOG Count)
LOG Count = Number of logged daily entries when on.
AVG Exter. TEMP = Ambient Average/24 hrs (Calendar day - local time)
NOTE:
Btu AVG varies from ASHRAE formula results by approximately ±0.2% due to SI to IP measure formula conversion within the program.

GENERAL DESCRIPTION OF THE DRAWINGS

For an understanding of this disclosure and its operation, reference is made to the following descriptions of the accompanying drawings in which.

Figure 3A:
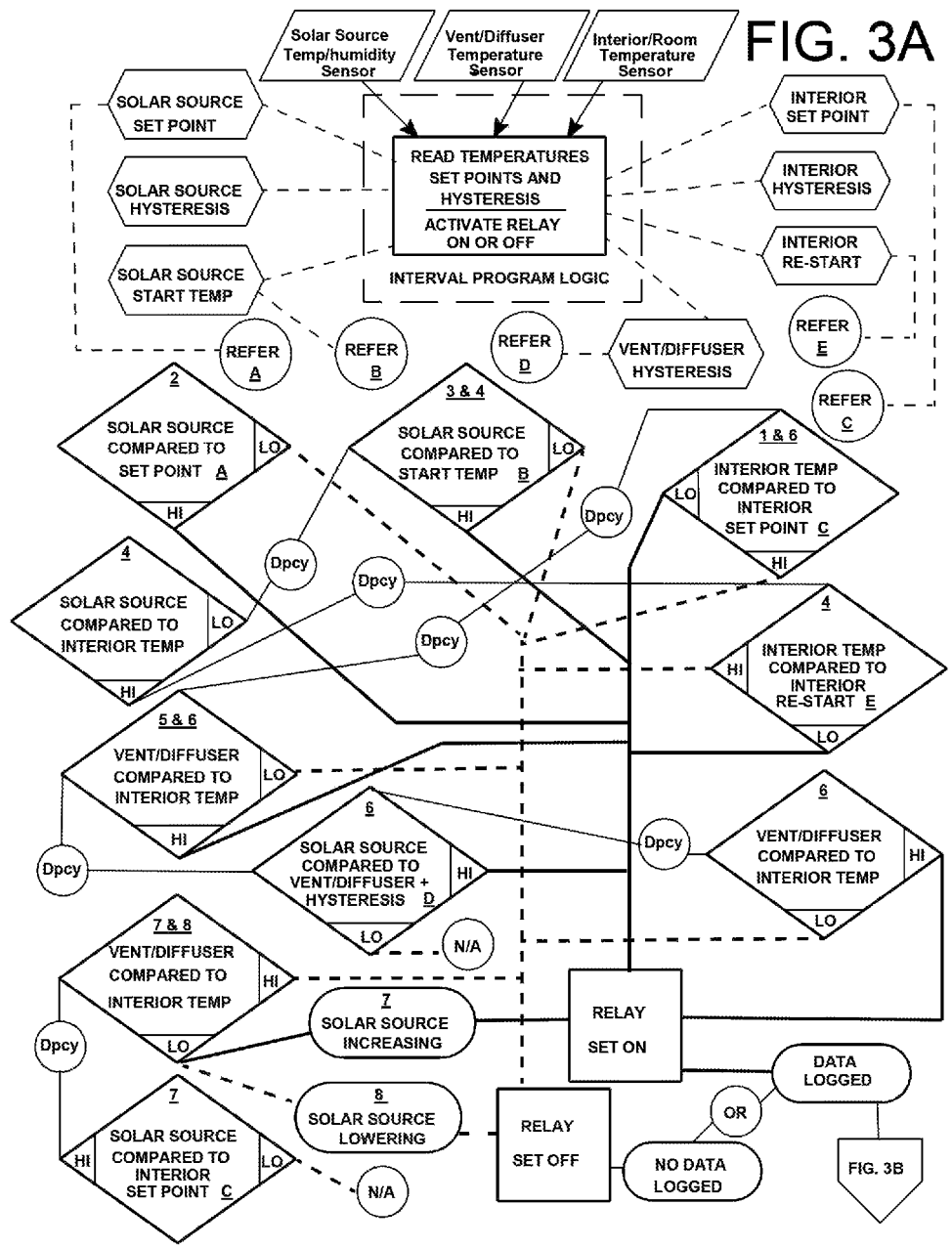
FIG. 3A illustrates a flow chart of the microcomputer program logic in the embodiment of the present invention to manage supply of solar source heated air to include the use of three temperature sensors and their relationships for purpose of activating the on-off regulator (relay switch)
Figure 3B:
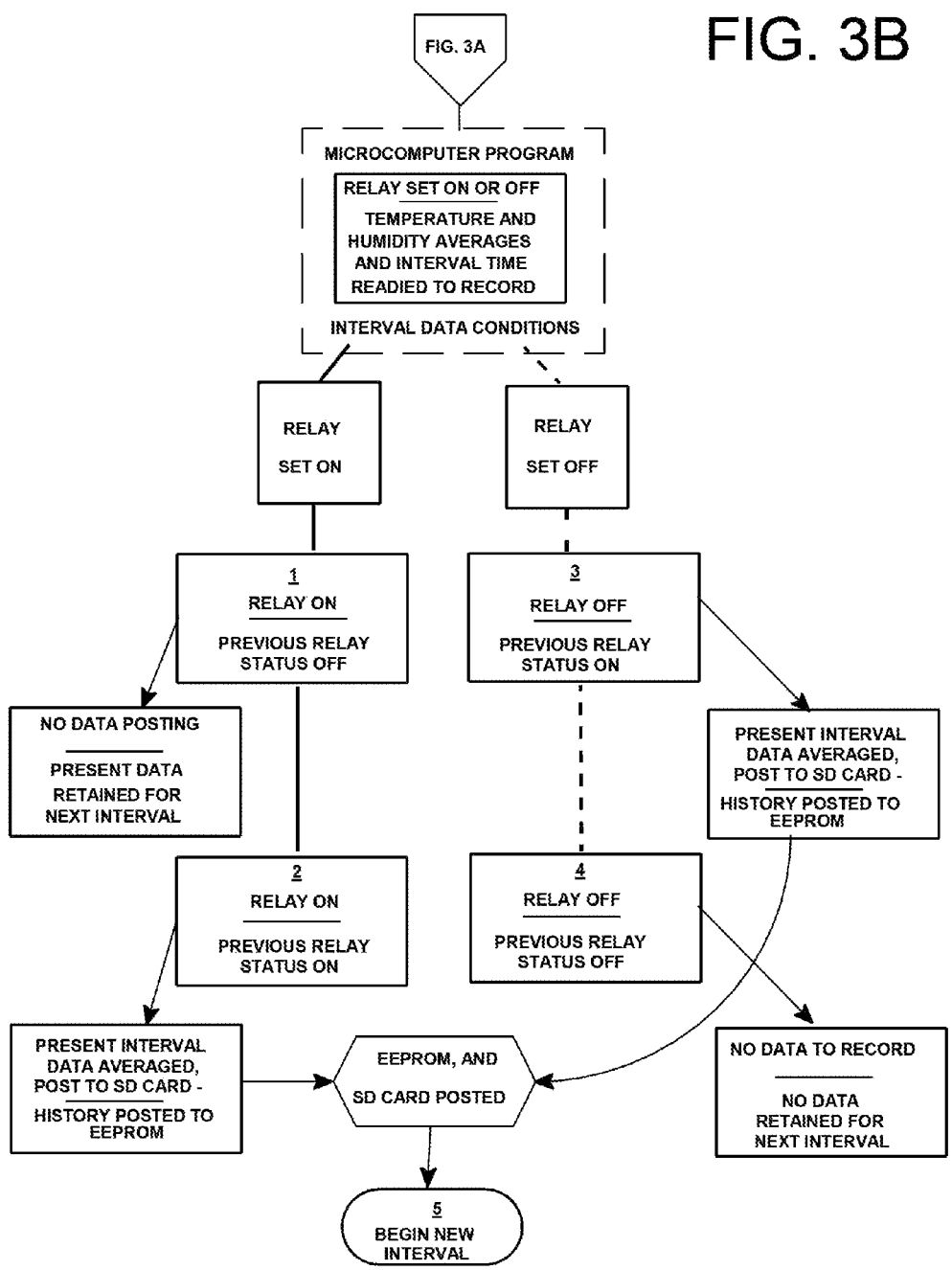
Figure 4:
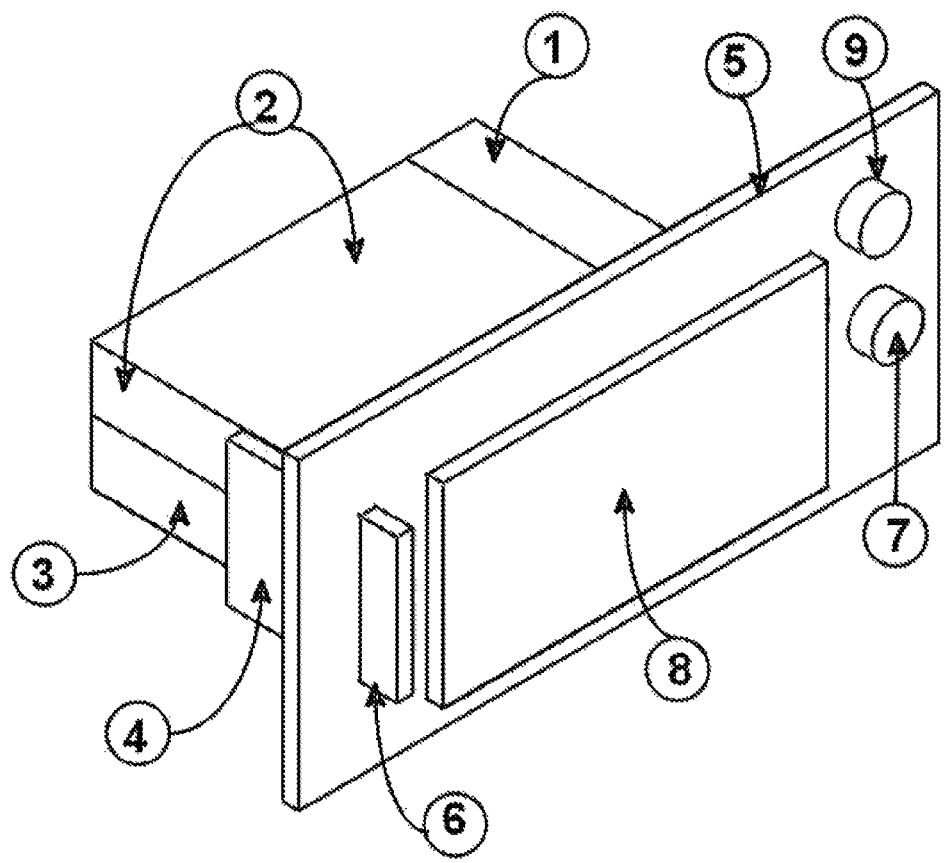
Figure 5B:
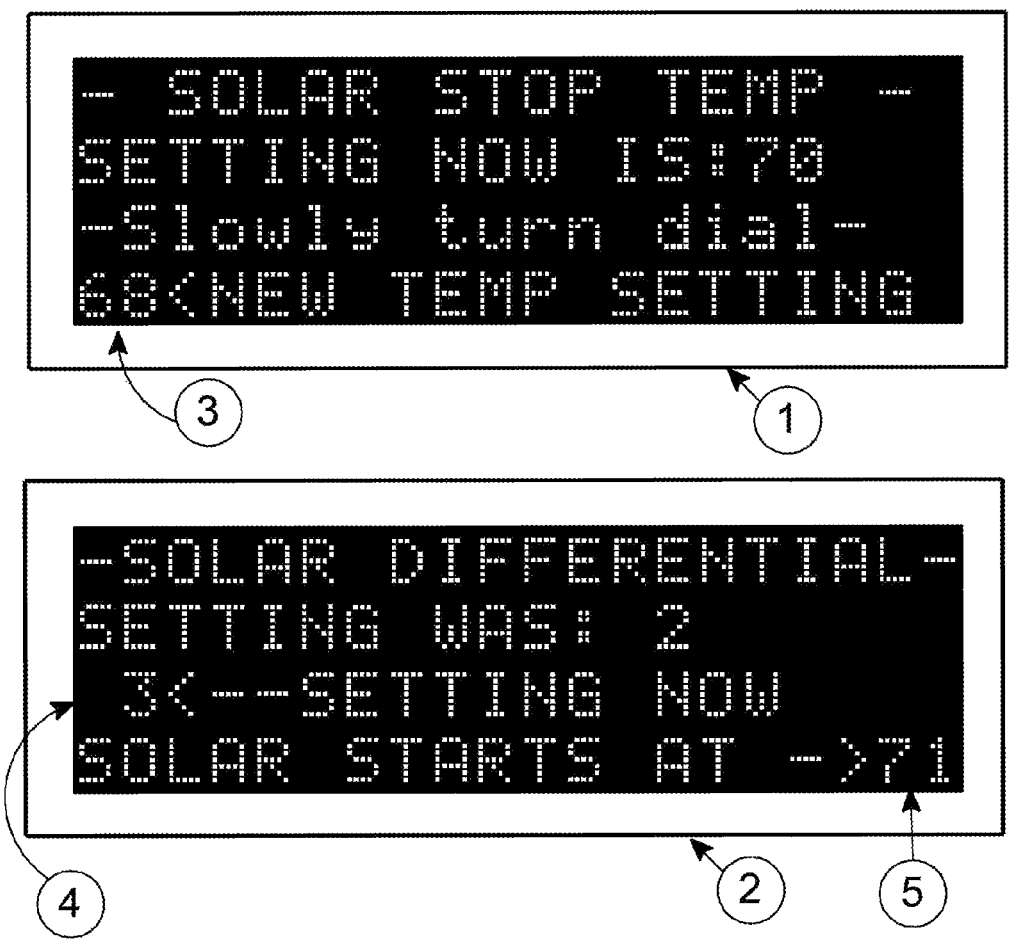
Figure 9:
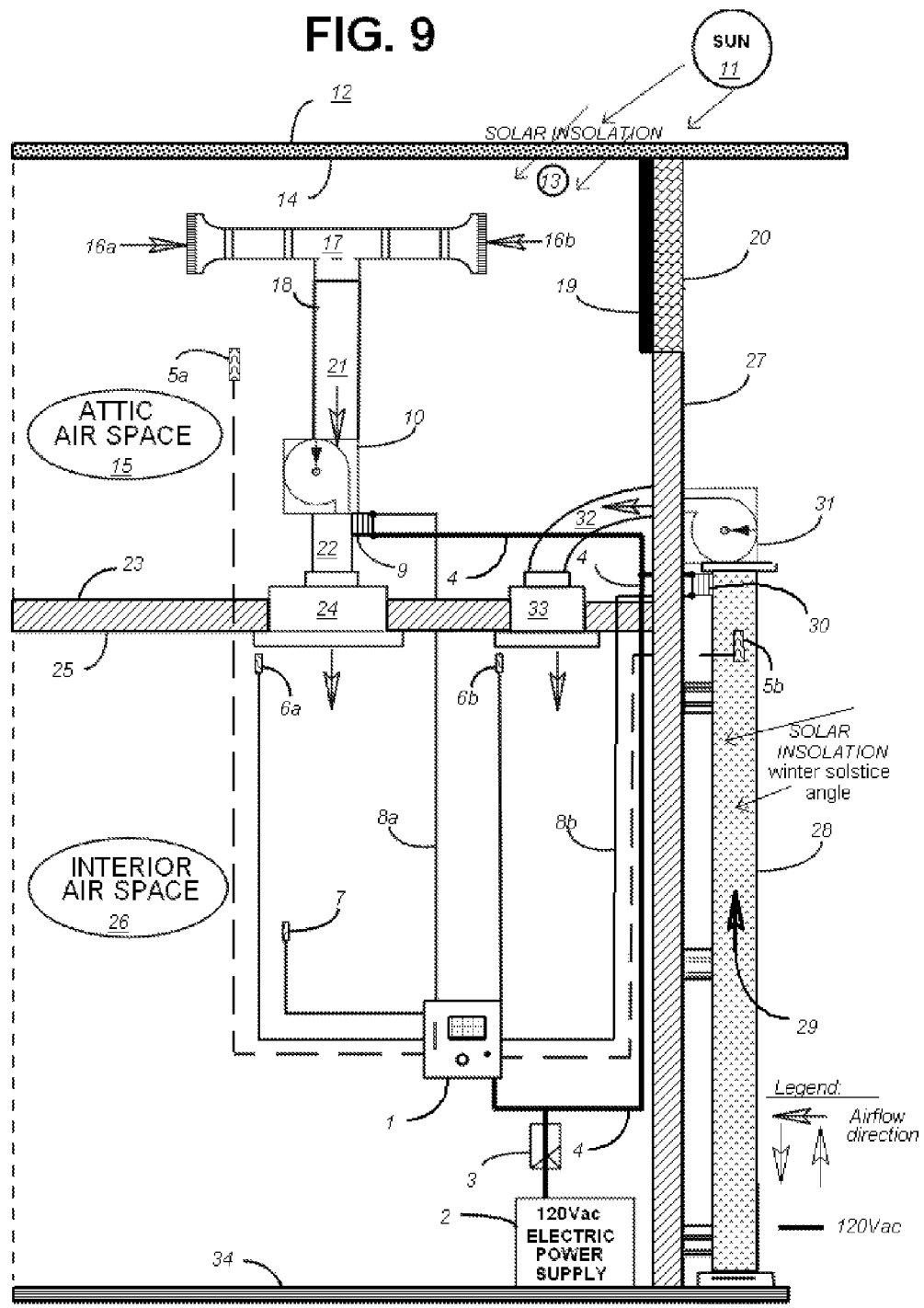

FIG. 3B illustrates a flow chart of the microcomputer program interval data conditions that result from logic steps taken in FIG. 3A to enable recording of temperature, humidity and elapsed time of operation. Such recording writes data to EEPROM onboard the microcomputer and to the SD card inserted into the SD writer, depending on the current and prior status of the relay switch during the operating interval;

FIG. 4 illustrates an isometric view schematic of the general structure of the packaged microcomputer and peripherals placed within an electrical switch box located inside a building for the space heating application of the present invention;

FIG. 5A illustrates the liquid crystal display (LCD) output screen presentations of the microcomputer program instructions for employment by the user to make necessary changes to set points and hysteresis (differential) settings;

FIG. 5B illustrates the liquid crystal display (LCD) output screen presentations of the microcomputer program at the point the user has made changes to the solar stop set point and the solar differential setting;

FIG. 6 illustrates the liquid crystal display (LCD) output screen that represents the primary user information output, which includes differential settings and interval minutes setting. FIG. 6 also illustrates the main operating status display screen showing current temperature readings from the three temperature sensors, the set points of the temperature control elements, and the current humidity within the solar source air;

FIG. 7 illustrates the liquid crystal display (LCD) output screens for date and time change with an example instruction for making necessary change to a specific 'Hour' from its current time of 12 pm to 11 pm as might occur for a daylight savings time adjustment;

FIG. 8 illustrates the liquid crystal display (LCD) output screens providing the history record of hours run, average solar source temperature and humidity, and the vent/diffuser temperature over the lifetime operation of the microprocessor while the space heating system operates in the 'ON' state during its time-set intervals.

DETAILED DESCRIPTION OF THE INVENTION

In the following, the present invention reference numerals are applicable to FIG. 1, listed parts of the apparatus.

Figure 1:
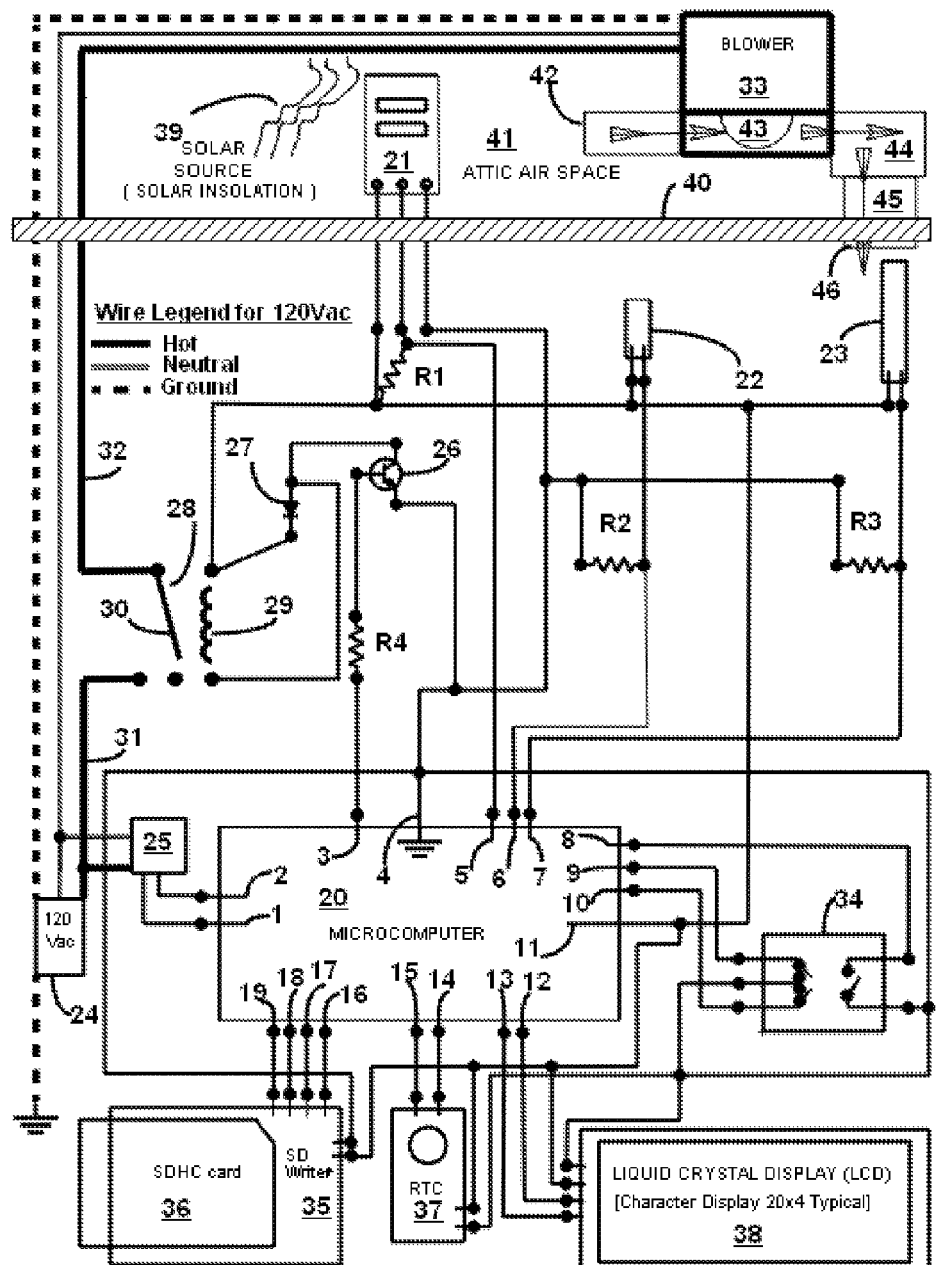
FIG. 1 illustrates a schematic of the embodiment of the present invention in a configuration according to its thermostatic controlling mechanisms, to include a numbered diagram of the electronic connections between software controlled microcomputer communicating pins and peripherals.

Microcomputer and Peripheral Devices on FIG. 1

20 microcomputer, operating at +5 volt direct current (ATMel 2560 Processor as example)
24 120 Vac main power supply to a 9 volt DC adapter powering the microcomputer
25 120 Vac to 9 volt direct current adapter for powering the microcomputer
33 HVAC blower (air mover)
34 rotary encoder (data input device), with pushbutton integrated into a rotary dial/knob to produce continuous movement clockwise or counter clockwise to effect a numeric input. [The computer program menu interprets push button action, and rotary movement of single digit left− or right+ increments for date and time entry and temperature set point entry.]
35 SD card writer/recorder (operates on Serial Peripheral Interface [SPI] Protocol)
36 SD card storage media chip—SDHC type (secure digital high capacity)
37 real time clock (RTC) storing date and time (month, day, year, hour, and minutes)
38 liquid crystal display (LCD) 20×4 (20 characters, 4 rows each)

Microcomputer Connectivity to Components and Peripheral on FIG. 1

20 microcomputer INPUT/OUTPUT connections illustrated on FIG. 1 include the following reference numerals, denoted from far left then clockwise to include digital and analog pins of the microcomputer with nomenclature term 'INPUT' referring to the incoming signal from a peripheral device to the microcomputer. The nomenclature term 'OUTPUT' refers to the outgoing signal to a peripheral device from the microcomputer.
1 adapted power 9 Vdc (direct current) such voltage is regulated to operational +5 Vdc in the microcomputer
2 adapted power 9 Vdc neutral (ground)
3 relay (OUTPUT from computer)
4 microcomputer ground 5 Vdc
5 solar heated air source temperature/humidity sensor (INPUT)
6 vent/diffuser temperature sensor (INPUT) [NTC type]
7 room/interior temperature sensor (INPUT) [NTC type]
8 rotary encoder—push button switch (INPUT)
9 rotary encoder—switch A (INPUT) rotary clockwise movement
10 rotary encoder—switch B (INPUT) rotary counterclockwise movement
11 +5 Vdc microcomputer source power to components and peripherals
12 liquid crystal display (LCD OUTPUT) 20×4, SDA pin ($I^2C$ Protocol)
13 liquid crystal display (LCD OUTPUT) 20×4, SCL pin ($I^2C$ Protocol)
14 real time clock [RTC—date and time INPUT] SCL pin ($I^2C$ Protocol)
15 real time clock [RTC—date and time INPUT] SDA pin ($I^2C$ Protocol)
16 MOSI: master output, slave input used for data OUTPUT from microcomputer to the SD writer
17 MISO: master input, slave output (output from slave) used for data INPUT to the microcomputer from the SD writer
18 CS (chip select, also known as SS: slave select) used for OUTPUT from master
19 CLK: serial clock for INPUT to the microcomputer Electronic Components and Peripheral Devices on FIG. 1

21 solar heated air source temperature and humidity sensor (left to right connection points) [left: connected to microcomputer Pin 11 (+5 Vdc), middle: microcomputer digital Pin 5 (INPUT), right: microcomputer ground Pin 4.]

R1 resistor—10 k Ohm between sensor 21 and microcomputer Pin 5 (INPUT).
21 negative temperature coefficient (NTC) thermistor for room/interior (or work area) at a typical location 4 ft. above floor powered by microcomputer Pin 11 +5 Vdc connection and microcomputer Pin 4 ground, with negative leading to microcomputer Pin 6 (INPUT).
R2 resistor—10K Ohm between sensor 22 to microcomputer analog Pin 6 (INPUT) and ground Pin 5
23 negative temperature coefficient (NTC) thermistor for diffuser/vent outlet at a typical location high on an interior wall or the ceiling (through attic floor) powered by microcomputer Pin 11 +5 Vdc connection and microcomputer Pin 4 ground) with negative leading to microcomputer analog Pin 7 INPUT.
R3 resistor—10K Ohm between sensor 23 to microcomputer analog Pin 7 (INPUT) and ground Pin 5
24 120 Vac power source disconnect (MAIN power with circuit breakers), or may be a simple on/off switch, or an interior thermostat used for power control of the microcomputer.
25 AC to DC adapter (120 Vac to 9 Vdc)
26 relay transistor, (component label 4001 typical)
27 relay diode (component label NPN 2222 typical)
28 solid state relay "SSR" (SPST relay type) having a signal range input of 3 Vdc to 32 Vdc in communication with the microcomputer (OUTPUT) 5 Vdc to energize the relay switch through microcomputer Pin 3 that controls the 120 Vac load service 31/32 to power the blower on/off status. [SSR can substitute for items 26, 27, 29, 30 and R4]
29 relay coil of a legacy relay (for schematic presentation purpose)
30 relay switch mechanism from normally open to closed position to activate 'hot' to blower motor
R4 relay resistor—2.2 k Ohm
  NOTE:
  ITEMS (26, 27, 29, 30, and R4 are part of an ad hoc schematic to illustrate circuitry to control a legacy coil type relay. These five components effectively incorporate their function into an SSR replaced by a SCR (silicon-controlled rectifier) or TRIAC. However, the five components remain on the supporting circuit board communicating with the microcomputer without compromising performance in order to accommodate use of an old style relay to prevent harming the microcomputer with voltage spikes emanating from coil/contact action.
31 relay load service side: 'hot' from 120 Vac power source/disconnect 24 to relay switch 30
32 relay load service side: 'hot 120 Vac from relay switch 30 to blower motor 33
33 blower (air mover) 120 Vac typical [no restriction on CFM output or voltage] blower served by 120 Vac hot 32, neutral and earth ground from disconnect or Main electric supply box (for the selected circuit)
34 rotary encoder with push button switch
  [rotary encoder selected as user input device for DATE/TIME changes and temperature control settings, including differential settings. (NOTE: a keypad or touchscreen input device is optional for this purpose)]
  connection to microcomputer Pin 8: encoder push button switch
  connection to microcomputer Pin 9: rotary switch A
  connection to microcomputer Pin 10: rotary switch B
  connection to microcomputer Pin 4: ground for rotary switches A and B, and pushbutton switch
  Alternatively: a connection to microcomputer Pin 11: +5 Vdc power (depends on the manufacturer configuration for the specific rotary encoder used)
35 SD card writer (data logger)
36 SDHC card (for a record of logged data)
37 real time clock (RTC)
  connection to microcomputer Pin 11: +5 Vdc
  connection to microcomputer Pin 4: ground
  connection to microcomputer Pin 15: SDA (data signal)
  connection to microcomputer Pin 14: SCL (clock signal)
38 liquid crystal display (LCD) (20×4 character display)
  connection to microcomputer Pin 11: +5 Vdc
  connection to microcomputer Pin 4: ground
  connection to microcomputer Pin 12: SDA (data signal)
  connection to microcomputer Pin 13: SCL (clock signal)
39 Solar source—solar insolation through building roof into attic air space
40 Attic peak—to denote roofline
41 Attic floor/Interior Ceiling—indicating the barrier between the attic and the building interior attic temperature/humidity sensor and HVAC supply duct
42 Attic air space—collects solar heated air for supplement space heating; attic space contains HVAC ducts, temperature/humidity sensor, electrical power source and air mover (blower)
43 HVAC intake—duct through which the blower pulls attic heated air
44 Air mover/blower—in attic space includes turbine/fan showing airflow direction of HVAC supply duct
45 HVAC supply duct—a plenum, diverter (Wye or T)
46 HVAC ceiling takeoff—connecting supply duct to HVAC vent/diffuser
47 HVAC vent/diffuser—for supply of solar heated air to building interior There are other aspects and features of the disclosure that will become more apparent upon reading the following detailed description in conjunction with the accompanying drawings. The present invention system and methods can be availed upon with modifications and alternative constructions not limited to those detailed below, therefore the intention is to cover all modifications and alternative constructions or any similar configurations falling within the spirit and scope of the present disclosure. Referring now to the drawings, the present invention and related HVAC component descriptions and methods illustrate disclosures in Figures as shown.

DRAWINGS

FIG. 1 illustrates embodiment of the present invention microcomputer thermostatic controller in its electrical and electronic operational configuration form (excluding: pictorial of the HVAC duct network, and a reset button on the microcomputer) for precise temperature management of source solar heat for space heating. Similar to a normal HVAC thermostat used in artificial heating, the present invention apparatus can remain on and operational throughout the entire heating season. Three temperature sensors provide input to the microcomputer program to manage solar space heating system operation during the daily sunlight solar heating excursion. The microcomputer program polls the solar source heat temperature throughout the daily operation using a remotely located temperature and humidity sensor. Two other temperature sensors mounted inside the building monitor the difference in temperatures of the source heat to that demanded for heat in the building interior. The first such two temperature sensors monitors interior temperature. The second of the two temperature sensors monitors temperature of heated air from the vent/diffuser outlet usually located in the ceiling or a wall, used to supply the heated air to the building interior. FIG. 1 shows the relationship of the three temperature sensors starting with the solar heated air source temperature/humidity sensor 21 in the primary role of managing startup and shutdown based on the solar collector temperature setting established by the user. The interior temperature sensor 22 is in the secondary role to manage the building interior temperature deemed desirable by the user. The vent/diffuser temperature sensor 23 functions as a matching (or differential 'DTC') temperature controller taking the tertiary role of shutting down the space heating system operation when solar heated air supplied through the vent/diffuser is equal to or lower than the interior temperature. The vent/diffuser temperature sensor 23 polls temperature then compares the value to temperature measured by the building interior temperature sensor 22. The comparison of temperatures is important in determining heat loss from the solar heated air as it moves through the HVAC supply ducts thereby becoming lower than the interior temperature at the end of the day's operation, with intention to avoid air of colder temperature to enter the warmer building interior. FIG. 1 illustrates the thermostatic controller electronics schematic (microprocessor and peripherals) which elements excluding the electric power source, blower, temperature sensors, and relay become a package for installation. Such packaged thermostatic controller inserts into an electric subpanel or within an electrical outlet or switch-box, either a two gang (4" square), or three gang (4"×6" rectangle) for a building interior location, (refer to FIG. 4 for example package configuration). The thermostatic controller is suitable for interior wall mounting similar to a normal line voltage interior thermostat, when packaged inside such electrical outlet box mounted into the wall. Operating peripherals include the rotary encoder, LCD display, and SD card slot, embedded onto a faceplate fit over the outlet box, with such package normally mounted in a wall with faceplate flush to the wall surface, or enclosed inside an electric subpanel.

The following is an explanation of the microcomputer and connected peripheral devices pertaining to FIG. 1.

A. Microcomputer 20

The present invention apparatus includes microcomputer 20 operating on +5 Vdc (direct current) incorporating flash memory, where software program instructions are stored, SRAM (static random-access memory) for program operation, and EEPROM (electrically erasable programmable read-only memory) for parameters and historical data storage that may be updated and accessed in real time. The microcomputer (also known as a microcontroller) has connectivity using its resident program memory communicating through physical pin connections to peripherals that function as a complete operating system in a small-form package. The microcomputer pins include analog, digital, and communication capability of I²C for SDA, SDL, used in the real time clock (RTC), and the liquid crystal display (LCD) and SPI communications for the SD writer. The microcomputer includes a central processor (for example—ATMel 2560 microcontroller) packaged with circuit boards and peripheral devices communicating through software program instructions. The microcomputer 20 requires 120 Vac main power 24 to serve 120 Vac electric current to a 9 volt DC adapter 25 powering the microcomputer 20 with +9 Vdc 1 and Ground 2. The 9 Vdc voltage input regulates to +5 Vdc within the microcomputer as required for operating voltage connectivity to the peripherals. The main electric power 24 (120 Vac for example) is provided through an alternating current (AC) 'Main' cabinet (or subpanel) disconnect, to include appropriate circuit breakers. The microcomputer and related circuit board for electronic components and connections to the peripherals fit into an ordinary electrical outlet/switch box for insertion into a wall convenient to the HVAC apparatus. The microcomputer package can fit into a 4"×6"×3" switch box in one model form (or a 4"×4"×3" switch box in a second model form that excludes the data logger apparatus). Such package to include the microcomputer, SD writer, and power supply inside the box. The liquid crystal display (LCD) and rotary encoder input device are located on a faceplate that fits onto the front of the electrical switch box. The present invention microcomputer, when packaged for installation, may include an SSR relay located inside the electrical switch box or subpanel. However, the SSR is more appropriately located exterior of the microcomputer package usually at or near the blower unit (depending on heat generated into the relay body from the amperage born by the load wires). The relay is suitable for a remote location where connectivity is through the low voltage wire cable (2 conductors) controlling the relay, which integrates with the 120 Vac power hot lead on the load side of the relay to operate the blower. Electrical power (120 Vac as example) neutral and ground will meet with the blower as separate wire connections to complete the electric load service. FIG. 4 illustrates the present invention in a packaged form locatable inside an electrical switch box.

B. Air Mover/Blower 33

The space heating system includes an air mover (blower) 33 to supply solar heated air through a closed loop HVAC system vent/outlet into the building interior.

C. Rotary Encoder or Other Input Methodology 20

User interface with the microcomputer 20 is through an input dial/knob and switch mechanism (rotary encoder 34) suitable for numeric data input to include date/time change and temperature control (reference parameter and hysteresis) settings. Rotary encoder 34 communicates with the microcomputer programmatically through an integrated push button switch and rotary dial/knob through which the user inputs elemental numeric data as required for date/time and temperature parameter (reference) set points and hysteresis by turning the encoder dial/knob. The microcomputer program menu instructs the user to operate the rotary encoder's push button action and single digit increment stops (clicks), with rotary clockwise (right +1) or counterclockwise (left −1) for each stop. The typical rotary encoder has 20 stops for each completed circle rotation. The program menu includes action for the real time clock date and time entry and the temperature parameter set points as entered using the rotary encoder push button switch and its rotary dial motion; all simple single digit numeric increments with limited motion required to make such changes. Alternatively, the present invention is compatible with a keypad or touchscreen device that would replace the rotary encoder for data entry use required to modify temperature reference set points and date/time. Use of a keypad/touchscreen for user parameter entry emulates the rotary encoder using a keypad entry format (up, down, right, left, and function keys) effecting the same results as the rotary movement and push button process of the encoder. Keypad entry involves the same single digit entry for each key press, but may also allow sustained digital movement by continuous pressure on the key for rapid movement during numeric or character selection depending on the keypad electronic controller features.

D. SD Writer (Recorder) 35 and SD Card 36

Temperature and humidity readings from the temperature sensors communicate with the microcomputer program code for recording of such reading on the SD writer (data recorder) 35, which electronically writes the logged data onto the SD card 36. The SD media card type normally used is a secure digital high capacity card (SDHC) typically found in electronic cameras, hand-held devices and personal computers. The microcomputer electronic protocol is Serial Peripheral Interface (SPI), commonly used between microcontrollers and peripherals, to operate electronic devices such as the SD writer, digital shift registers, and sensors.

E. Real Time Clock 37

Real Time Clock (RTC) 37 is an electronic chip component that incorporates date (day, month, year), and time (hours, minutes, seconds) in its electronic timeworks. The RTC 37 includes such digital date/time chip mounted on a small circuit board powered by a long lasting battery with communication capability using the SDA/SCL ($I^2C$ Protocol) to synchronize date/time for use in the microcomputer software program's date/time stamping process as required for communication with the SD writer 35. Date and time are essential elements of the SD card filing system to facilitate transfer of a data file to a computer for use in program applications and to time stamp such file creation date.

F. Liquid Crystal Display (LCD) 38

Liquid crystal display (LCD) 38 prints information in a format of 20 characters on four (4) rows (this invention example). The display of the present invention system includes identifying model number; serial number; apparatus build date; program version; historical temperature data recordings (EEPROM resident). The LCD also displays pertinent operation menus used in temperature settings for solar heat source, vent/diffuser, and room/interior setting along with differential temperature settings for solar heat source and vent/diffuser. The LCD connects to the microcomputer through four (4) wires in two connection sets: Set 1 is +5 Vdc power and ground wires; Set 2 is the $I^2C$ protocol SDA and SCL communication signal wires. An LCD is operational in its physical form using an electronic addressing module containing a shift register chip that converts signals from the LCD's multiple communication channels (normally 16 in total) into two wires (SDL and SCL) managed through an electronic address port of the microcomputer, plus two wires for power and ground. The LCD communication channels connect to the microcomputer with the software program interpreting signals for display on the LCD. Such signals are those condensed to two wires from several pins on the LCD by employment of an electronic chip shift register for communication with the $I^2C$'s SDL and SCL connections plus two wires for power of +5 Vdc and ground to enable characters (alphanumeric and symbol) to be programmatically displayed onto the LCD display screen. The liquid crystal display LCD 38 may be in many size formats to include models with more character lines and rows as required for optional application data display, with such LCD accommodated through customized software program versions of the present invention.

Operational Microcomputer Program Control Connections of FIG. 1

The microcomputer 20 software program interfaces with various analog, digital, and communication pins required for such software program using the connected peripherals discussed above. Microcomputer 20 INPUT/OUTPUT shown on FIG. 1 illustrates such connections shown on the drawing identified by numerals 1 through 19. The nomenclature term 'INPUT' refers to an incoming signal from a peripheral device to the microcomputer. The nomenclature term 'OUTPUT' refers to an outgoing signal to a peripheral device from the microcomputer. FIG. 1 drawing of the microcomputer illustrates the analog and digital electronic connection pins at left then clockwise in chronological order. Electricity from 120 Vac powers an AC to DC adapter to provide typically 7 Vdc up to 9 Vdc on Pin 1 in association with ground Pin 2. Pin 3 (OUTPUT from the microcomputer) sends a signal to the relay to turn on or turn off. Ground 5 Vdc 4 provides the circuit completion of the microcomputer electronics. Source heated air temperature/humidity sensor 5 (INPUT) communicates heat/humidity value of source solar energy heat entering the HVAC supply side. Vent/diffuser temperature sensor 6 (INPUT) [a negative temperature coefficient thermistor (NTC)] provides input for measurement of the solar heated air temperature as it exits the HVAC supply side entering the building interior space through a vent/diffuser. Room/interior temperature sensor 7 (INPUT), also an NTC type thermistor, functions as would a normal interior bi-metal thermostat to control the maximum temperature of heated air supplied to the building interior. There is no specific need for hysteresis (differential) temperature setting relative to the interior temperature. Most thermostats use hysteresis 'differential' setting for example, in a net change mode of 0.556 to 1.667° C. (1 to 3° F.), however, since solar space heating is a supplement to the resident artificial space heating system, and because of generally lower volatility of temperature from the solar heat source, a hysteresis adjustment would be unnecessary. The present invention program does however provide for the interior temperature differential to invoke a restart of the system when interior temperature reaches the lower limit of the hysteresis (differential) setting established by the user; the room/interior set point reference and the hysteresis interior temperature differential. If the interior temperature differential is set to zero (default), there is no restart using such differential reference setting; the microcomputer programmed temperature set point controls the outcome. The vent/diffuser temperature monitored by the vent temperature sensor enables control of the solar heated air supplied into the building interior, thus when such heat is equal to or less than the interior temperature, the relay shuts off. Use of interval settings for on-off regulator management (in minutes), relative to temperature rise and fall during the sunlight hours, is controlled by the user, which is recommended for review after some experience with the system operation. Rotary encoder 34, push button switch 8 (INPUT) invokes an interruption of the program loop (a program software interrupt) to enable changes to temperature parameter settings within the interval time for logging data. The rotary encoder device substitutes for a keypad entry method (or touchscreen) by emulating a keyboard right, left, up, down and enter buttons. The rotary encoder has a single push button knob with an unstoppable dial movement for going around and beyond the 360 degrees clockwise (right) and counterclockwise (left) to enable the full range of control (similar to a keypad) using software programming, even allowing for multiple complete rotations in one direction or the other. Rotary encoder switch A 9 (INPUT) senses clockwise motion of the encoder dial with the microcomputer program causing a single digit numerical increase when recognizing a physical stop (click) during the switch rotation. Rotary encoders are manufactured with various built-in stops (20 or 30 stops or clicks for example) in a complete rotation of a 360 degrees circle when turned clockwise or counterclockwise to produce the numerical changes required for temperature settings and for date and time changes. Each stop (click) indicates an increment or decrement of 'one', in either rotational direction, which the microcomputer program recognizes as coming from the encoder rotational switches (A or B) function. The software program menu displays the existing setting thus requiring only single digit incremental changes normally required by the user with minimal rotary motion. The rotary encoder switch B 10 (INPUT) senses counterclockwise motion of the rotary encoder in the same manner as encoder switch A 9 (INPUT) as described above. The internal power source of the microcomputer exits through +5 Vdc (direct current) Pin 11 to support the electronic components and peripherals activated by software program instructions. The real time clock (RTC) 37 and liquid crystal display (LCD) 38 both communicate through electronic 'standard inter-integrated circuit' ($I^2C$ Protocol) requiring 4 wires; 2 wires for connectivity to the microcomputer plus one +5 Vdc and one ground wire. Liquid crystal display (LCD) 38 has a 20×4 format (20 characters/symbols on 4 lines). The LCD 38, uses SDA Pin 12 ($I^2C$ Protocol OUTPUT) and LCD 38 SCL Pin 13 ($I^2C$ OUTPUT) to communicate the character display generated by the microcomputer software program. The LCD displays instructions, operations status, and menu instructions to effect changes in date/time setting, timed interval setting, control temperature set points, and hysteresis 'differential' temperature settings as necessary. The LCD displays the aforementioned operation status of real time temperatures and parameter settings during the operating interval. The real time clock (RTC), is an active date and time microchip on an electronic board that communicates date and time through SDL Pin 14 ($I^2C$ INPUT) and the real time clock (RTC) SDA Pin 15 ($I^2C$ INPUT). The RTC is required for the date/time stamp at each interval completion as it records temperature and usage history data logged from beginning to ending of each active interval while the relay is on. Accurate date/time is required for presentation of the recorded temperatures and humidity and the elapsed time between such data logging. Logged data, when included with the blower motor 'cubic feet per minute' (CFM) airflow output of the heated air, allows computations to be made by the user to verify the system Btu measure of heat delivery and performance of the present invention as it controls the HVAC space heating system connected thereto. Data logging utilizes the SD writer 35 and SD card 36 in communication with the microcomputer and the other peripherals that support the present invention packaged apparatus. The microcomputer completes the data logging at the end of the interval when temperature conditions provide sufficient heat to activate the relay coil 29 to an 'ON' state thereby logging a completed interval of data for averaging of the readings at both ends of the interval. The SD writer operates on the SPI Protocol using Master Output, Slave Input (MOSI) Pin 16 as input to the slave SD writer from OUTPUT by the microcomputer as Master, and the Master Input, Slave Output (MISO) Pin 17 as output from the slave SD for INPUT to the microcomputer. The chip select (CS) Pin 18, also known as SS (slave select), uses a unique digital address for the SD writer to communicate with the microcomputer. The serial clock (CLK) Pin 19 is output from the SD writer as INPUT to the microcomputer. Solar heated air source temperature and humidity are read from sensor 21 which illustrates left to right connection points: at left, the microcomputer Pin 11 connection to +5 Vdc, sensor 21; middle, connection point for the temperature and humidity signal to microcomputer digital Pin 5 (INPUT); and at right, the ground pin of the sensor to the microcomputer ground Pin 4. Resistor R1 10 k Ohm is required for the solar heat source sensor 21 communicating with +5 Vdc Pin 11 and microcomputer solar heat sensor Pin 5 (INPUT). Negative temperature coefficient (NTC) thermistor sensor 22, is located typically four feet above the floor on the interior wall, and comprises two leads, a positive +5 Vdc and negative ground, plus a 10K Ohm resistor. Microcomputer 20 Pin 11 provides +5 Vdc connection point to sensor 22 and microcomputer 20 ground Pin 4. Microcomputer 20 analog Pin 6 (INPUT) routes from sensor 22 ground lead to resistor R2 at 10K Ohm between the ground connection point and microcomputer Pin 5. Microcomputer 20 analog Pin 6 (INPUT) from the ground connection and 10 K Ohm resistor R2 provides for an accurate calculation of temperature through interpretation of the voltage variation, much like a potentiometer. Such voltage variation occurs when temperature change affects the NTC sensor's metal body as it expands or contracts upon which the voltage value becomes the INPUT to Pin 6 of microcomputer 20. Negative temperature coefficient (NTC) thermistor 23 senses temperature at the vent/diffuser (vent register) located above the floor on the interior wall or in the ceiling (or a floor location), comprising two leads, a positive +5 Vdc and negative ground and the 10K Ohm resistor. Microcomputer 20 Pin 11 provides +5 Vdc connection point on sensor 22 and microcomputer 20 ground Pin 4. Microcomputer 20 analog Pin 6 (INPUT) routes from sensor 22 ground lead to 10K Ohm resistor R2 between the ground connection point and microcomputer Pin 5. Microcomputer 20 analog Pin 6 INPUT from the ground connection and resistor R2 is included in the +5 Vdc voltage variable change based on temperature affecting the NTC sensor's metal body creating the voltage variation for INPUT to Pin 6 of microcomputer 20. Electricity of normally 120 Vac power source is depicted by disconnect 24 being either the main electrical circuit box or a subpanel with appropriate circuit breakers installed. The main power serves the AC to DC adapter 25 (120 Vac to 9 Vdc) used to power the microprocessor and all peripherals having been regulated internally to +5 Vdc typical. The relay operatively engages with the blower (air mover) when the microcomputer program has called for 'ON' or "OFF" status from temperature readings as compared to settings. The relay electronic components mount on a circuit board connected to the microcomputer for communicating ON/OFF status comprising the following: transistor 26 (component labeled 4001 typical), diode 27 (component labeled NPN 2222 typical), and resistor R4 (2.2 k Ohm typical). The relay 28 components described herein are essential for most mechanical contact and coil type relays. The microcomputer signals +5 Vdc to the relay coil 29 communicating through microcomputer Pin 3 to switch the relay normally open condition to now 'closed' operational status to enable 120 Vac power to relay load 32. Relay coil 29 (depicted for the FIG. 1 illustration) and relay switching mechanism 30 status is normally open (with no power crossing through) which requires a signal to 'close' and complete a connection that activates the HOT electric power load to blower motor 33. The relay load 31 (service side) obtains HOT 120 Vac power source 24 via the Main or subpanel disconnect. The preferred relay example, however, is a solid-state (SSR) of SPST (single pole single throw) type that activates through a design signaling range of +3 Vdc up to +32 Vdc with the +5 Vdc output from the microcomputer meeting within such range. The SSR relay would consolidate each of the elements associated with FIG. 1 components 26, 27, 29, 30 and R4, into 1 (one) electronic apparatus. The SSR relay has no moving parts or contacts required to switch the microcomputer signal power on/off to the load as such action of the SSR relay switches electronically. The SSR relay uses an SCR (silicon-controlled rectifier) or TRIAC (triode for alternating current) technology that assumes the function of a transistor, a diode and resistor were a legacy relay used instead. SSR relays do not use a wound coil or physical contacts ('points'). However, the present invention uses the disclosed relay circuit of FIG. 1 to avoid any possible misapplication or malfunction issues for users when employing non-SSR relays to communicate switching ON/OFF to the space-heating blower. Relay load service 32 is the 120 Vac HOT wire, when switched ON, from relay 28 to blower motor 33. The SD writer 35 is a popular apparatus used in many electronic devices including laptop and desktop computers, cameras and data loggers. SD card 36 (SDHC type) is the digital memory storage unit (for recording data). Blower 33 (air mover using electricity of 120 Vac as typical) is powered through hot, neutral and earth ground service from a Main electrical cabinet or subpanel 24 (with appropriate circuit breakers). Electric power can be any suitable voltage level (240 Vac for example), requiring an appropriate relay device suitable for the air mover (blower) electric power load controlled by the microcomputer program. The SSR or any other relay form may require dissipating the heat generated by the electric load amperage, as it passes through such relay during system operation, using a heat sink or isolating the relay device from other heat producing apparatus or high temperature locations.

FIG. 1 diagram further illustrates a building attic air space 42 as a containment area for solar heated air, such attic air space located between the attic peak 40 and the attic floor 41. The sun generates heat through the process of solar insolation creating the solar source 39 such heat energy penetrating the building roof materials to heat the attic air. The building attic floor 41 is the barrier between the attic and the building interior. Solar heated air of the attic flows through an HVAC intake duct 43 attached to blower 33 which pulls heated air through by turbine or fan blades 44. The heated air flows into the HVAC supply duct 45, which is attached to the HVAC ceiling takeoff 45 placed through the attic floor entering through the building interior's ceiling. The solar heated air flows through the HVAC assembly into the HVAC vent/diffuser 47 to supply solar heated air to the building interior for space heating.

Figure 2:
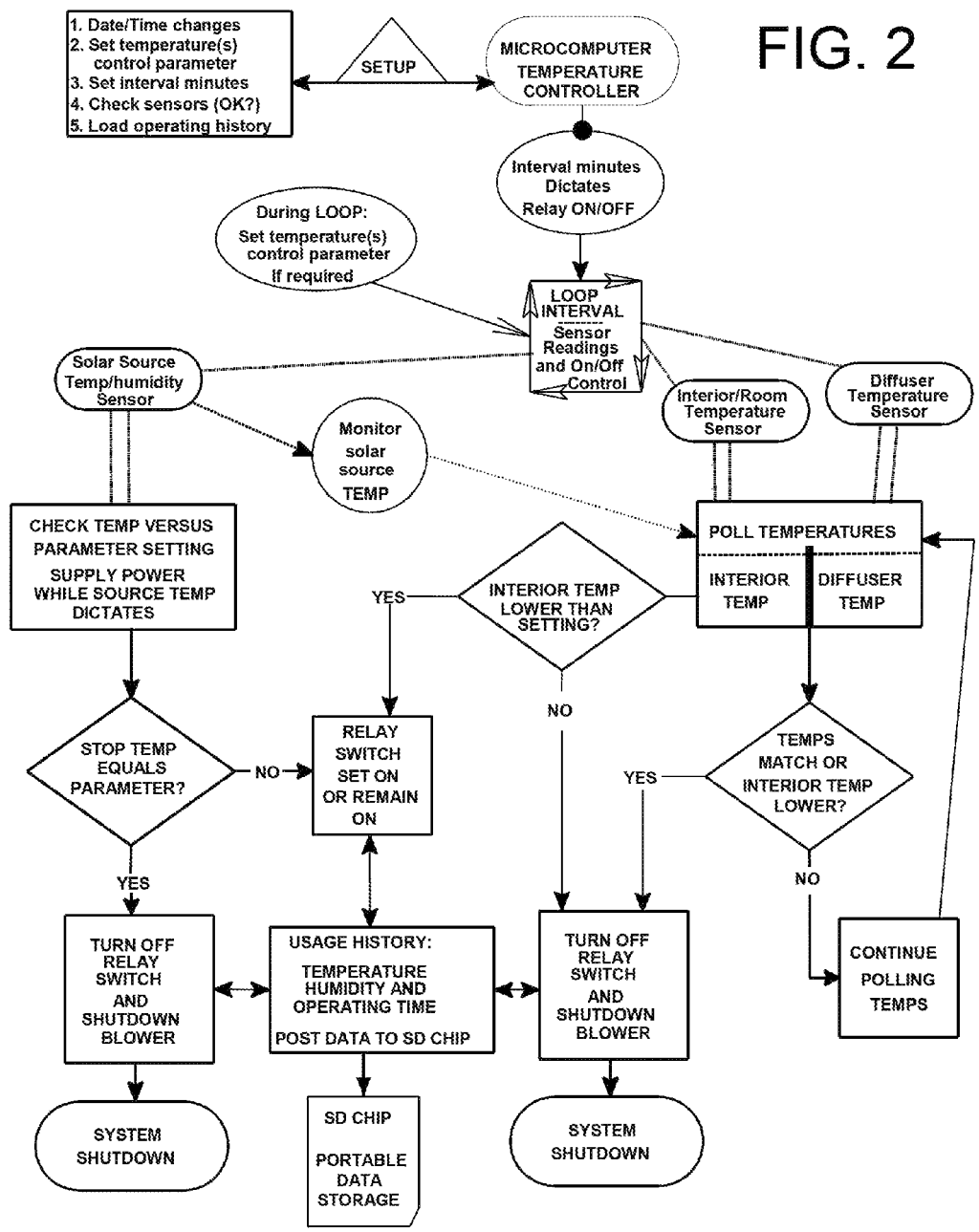
FIG. 2 illustrates a flow chart of the microcomputer program thermostatic control software configuration for operating during the timed interval of the present invention.

FIG. 2 is a flowchart diagram of the microcomputer program instructions illustrating the general software features of the microcomputer and its onboard EEPROM used to store control parameters. The control parameters include the temperature set points (references) for solar source stop temperature, interior/room temperature, differential temperatures and the minutes per interval controlling the relay on-off status. The EEPROM also stores historical temperature and humidity averages and the hours of usage over the lifetime operation of the specific microcomputer within the present invention apparatus. Such EEPROM is unaffected by the microcomputer power on-off status being of solid state read/write memory like that of a hard disk or USB thumb drive. The flowchart includes the main program logic to perform date and time settings that control clock time of the data logging activity for purpose of recording such data onto the SD card. The SD card records the temperature data elements for historical and analytical purpose so the user can determine the effectiveness of the system performance. The data file as created and stored on the SD card allows for transfer to permanent storage and analysis when located on the internet cloud, a personal computer, or storage media for safekeeping. SD cards are capable of storing significant amounts of data, with the present invention requiring minimal data space however. The user can employ multiple SD cards for permanent records or for reasons of analysis. FIG. 2 represents the processing loop of the microcomputer program during powered operation. A restart of the microcomputer enables a setup process which in interruptible to include date/time and interval settings, as well as temperature reference set points if necessary. The microprocessor software program requires the user to input the hysteresis (differential) setting for the interior room temperature and the vent/diffuser. Hysteresis setting for interior temperature [net change temperature mode] 0° C. (0° F.) is the default due to the moderate temperature level increase or decrease throughout the sunlight hours. Once the solar source temperature has increased to above working temperature for space heating, and elevates to maximum temperature level at the height of the solar day, heated air is available and useful depending on the user parameter set point for room/interior temperature. A 'zero' hysteresis setting for the room/interior results in the relay turning 'off' when the temperature has reached the room/interior set point as suitable for comfort of the occupants, and will not turn 'on' again if the source heat temperature remains insufficient. The interior differential temperature swing (hysteresis) is usually minimal as solar source temperature drops below usefulness when the sunlit solar collector begins to cool in the afternoon thus encountering the system stop temperature dictated by the heat source temperature (stop reference) set point. FIG. 2 steps, from top to bottom of the illustration, start with the 'SETUP' option required for user input to include these items:

1. Date and Time, if Necessary
   a. Change month, day, year, hour and minutes (no seconds)
2. Set Temperature Control Parameters
   a. Solar heated air source stop temperature reference setting
   b. Solar heated air source differential temperature setting (controls startup temperature) to start the system adding the differential to the stop temperature (a. above)
   c. Interior (room/interior) temperature setting (maximum)
   d. Interior differential setting (optional)=default is 0° C. (0° F.) [This setting is net change]
   e. Maximum vent/diffuser differential setting (optional) =default is 0° C. (0° F.) maximum is 8.33° C. (15° F.) 'net change'. [NOTE: This setting is net change tied directly to the ongoing vent/diffuser temperature; the vent/diffuser "SET" temperature floats with the actual vent/diffuser temperature regulated to temperature of the solar source].
   f. Maximum interior temperature allowed is 29.44° C. (85° F.) as is typical of most interior thermostat temperatures, which range from 4.44° C. (40° F.) to 29.44° C. (85° F.)
3. Set Interval Minutes
   a. Default is 15 minutes, with settings allowed for 5 minutes minimum up to 60 minutes.
4. Check Sensors (Ok?)
   a. Verify the connections from sensors to the microcomputer for integrity of the signal to provide proper temperature or humidity readings.
5. Load Operating History The microcomputer software program searches the EEPROM for the last historical data value recorded, the highest value in the range of sequentially recorded entries, residing on the EEPROM in the allocated storage area. The EEPROM storage area requires 16 bytes for each segment of historical data (humidity, solar source and vent/diffuser temperature, plus the total history of operating minutes). A total of 960 bytes of EEPROM is utilized (60 segments of 16 bytes each) by rotating writes to the 16 byte segments over the life of the microcomputer to preserve integrity of the EEPROM electronic elements from overuse. Such sequential data storage is required in event of a restart or power failure affecting the microcomputer posting of the last entry. In event of power outage or other unforeseen issue with the microcomputer, or upon restart, a search is made of the valid data with the highest value thus resulting in throwing out an erroneous entry from inclusion in the computation when recalculating historical data during resumed operation. EEPROM is known for degrading over time following many 'writes' and may lose ability to store information, therefore the present invention accounts for this in programming by rotating such writes to the EEPROM area (in the 16 byte data segments) when storing the historical data averages to avoid excessive writes to single bytes. The EEPROM stores the historical data in such segments; each segment the data from the current 'interval' while the system was operating ('ON'). Such historical data is the total of all average temperature readings along with the historical total of interval time (in minutes) of operation since the build date of the apparatus. If EEPROM corrupts in any way, it could be a single segment (byte) of data. Should there be such corruption resulting in an erroneous interval posting requiring error recovery, the result would be insignificant in the overall computation of historical averages. The data logger will have written the correct data as a permanent record to the SD card as backup.

6. Operation Loop

The operation 'loop' is the continuous microcomputer programmed instructions processed during an operating interval, only stopping when shutting off power or when pressing 'reset' on the microcomputer. The loop halts during interval operation when the user chooses to interrupt such operation to change any of the various temperature set points or hysteresis (this action does not turn off the microcomputer). Periodic reading of source temperature, vent/diffuser temperature, and interior temperature is the primary input for programmatic action during the operating loop. Differential temperature settings (hysteresis temperature range) integrate into the logic to enable the program to act on such settings depending on changes in any one of the three (3) input temperatures sensed, with the adjustments as required for the hysteresis (differential) temperature settings entered for the solar source, vent/diffuser and interior. The operational loop completes the interval period, in minutes, as established by the user, and begins anew in a continuous manner, until turning off the system power.

FIG. 3A is a flow chart illustrating the instruction logic programmed into the solid-state microcomputer of the present invention thermostatic controller. FIG. 3A diagram is the main logic for temperature sensing that collaborates with parameters for hysteresis settings and the specific reference temperature set points. Such sensing includes the solar source heated air supply, the vent/diffuser, and the room/interior for control of the space heating system operation. FIG. 3A shows the solar source heated air temperature sensor on the left side of the diagram; the vent/diffuser temperature sensor in the middle; and the interior matching temperature sensor on the right side. Each sensor functions in partnership with the other sensors to control the solar space heating system primarily based on solar source temperature value as it relates to room/interior temperature value. The program computation process polls (1) solar source temperature using the remote temperature sensor placed in or near the solar source collection apparatus, (2) supply temperature in or near the supply vent/diffuser, and (3) temperature inside the room/interior/working space (such sensor located approximately 4 feet above the floor). The FIG. 3A diagram illustrates the polling of temperature values at each of the three sensors necessary to manage on-off regulations of the HVAC system blower. The microcomputer program engages the relay to be 'ON' when solar source temperature reaches the 'START' temperature. The microcomputer program deactivates the relay to 'OFF' when the temperature of the solar source heat entering through the vent/diffuser is equal to or is lower than the temperature level in the building interior during late afternoon as the daily solar energy cycle recedes (or may deactivate intermittently during sunlight hours if weather pattern causes inconsistent solar heating). A timing element within the program logic sets the temperature polling for each sensor to occur every 30 seconds for display of results onto the LCD screen for user observation. The primary loop operates over a number of minutes interval set by the user to avoid ratcheting an on or off relay state from the microcomputer, such interval as selected ranges from 5 minutes to 60 minutes. When the solar source temperature is satisfactory, the daily process begins with the microcomputer switching the relay ON. The vent/diffuser sensor then assumes shared command to determine the temperature status from both the solar source and the room/interior monitored against the temperature exiting the vent/diffuser. The space heating system controls the blower with the on-off relay based on initial governance from suitable temperature determined at the solar source, measured against the need for heat in the building interior. Providing there is sufficient solar source heat, the overall operating process yields to the vent/diffuser temperature value to cause the space heating system to cease operation, thus avoiding colder solar source air from entering the building interior when such interior temperature is greater than such solar source air. As solar source heated air enters the HVAC ductwork to exit through the vent/diffuser outlet, temperature level may be lower at the vent/diffuser as affected by duct efficiency and static pressure. Steps taken in the flowchart indicate the start condition of the controller and the decision point when interval polling occurs in order to determine if the solar source temperature is equal to or lower than the interior temperatures. The present invention controller powers down the space heating system by actuating the onboard relay switch 'OFF' at the end of the daily solar cycle if not already forced 'OFF' by action of the solar source temperature controller with its commanding temperature 'STOP' setting. Otherwise, the system shuts down when reaching the desired set-point temperature parameter of the room/interior temperature. The program logic steps in the following paragraph include the numerals, abbreviations, and notation types on FIG. 3A as follows:

(i) Numerals reference the logic steps 1 through 8;
(ii) Notations "REFER A through REFER E" are the reference set points and hysteresis settings involved within the logic steps;
(iii) Abbreviations for 'higher than' or 'lower than' (HI and LO respectively) indicate the route taken in the flow logic step, with the first temperature as the primary value for a comparison to the next element which is a stated reference temperature or set point. If such primary value were higher than the named reference temperature or set point, the routing identifies 'HI'. If the primary value were lower than the named temperature or set point, the routing identifies 'LO';

(iv) Abbreviation 'Dpcy' is for the word 'dependency' indicating that the result considered for command in the logic step depends on a specific temperature read value, hysteresis/differential setting or reference set point.

FIG. 3A, Program Logic Steps During the Interval Loop: Solar source current temperature for suitability of space heating begins with such source temperature higher than the reference 'START' temperature set point. The START temperature set point is the sum of the solar source 'STOP' temperature set point plus the solar source temperature hysteresis (differential adjustment), in degrees, that allows the HVAC system relay to activate 'ON' necessary to engage the system air mover (blower). The space heating system relay activates when solar source temperature is higher than the 'START' temperature' as long as the present interior temperature is lower than the interior temperature reference set point. The above monitored conditions within the present invention microcomputer program activate the relay 'ON', or 'OFF'. Interval monitoring of solar source temperature, the vent/diffuser temperature, and the interior temperature, takes place within the programmed logic steps during the timed interval loop of the present invention microcomputer. Solar source temperature governs space-heating startup in association with interior temperature setting during monitoring of the vent/diffuser for temperature suitability within the following logic steps of the microcomputer program.

LOGIC STEP 1: If the interior temperature is higher than the interior temperature set point, the relay is set 'OFF'. This step also takes action to see that interior temperature does not exceed the maximum interior temperature default of 29.44° C. (85° F.). The software program begins another interval without further action and skips over the remaining logic steps.

LOGIC STEP 2: If the solar source temperature is lower than solar source STOP temperature (reference) set point, the relay is set 'OFF'. The software program begins the next interval without further action and skips the remaining logic steps.

LOGIC STEP 3: If the solar source temperature is higher than the solar source START temperature set point, the relay is set 'ON'. Solar source START temperature set point is the solar source STOP temperature set point plus the solar source hysteresis setting. The solar source START temperature governs the initial system startup at the beginning of the daily solar cycle.

LOGIC STEP 4: If the solar source temperature is higher than the solar source START temperature set point, and such qualified solar source temperature is higher than the present interior temperature while the interior temperature is lower than the interior temperature set point plus the interior hysteresis (differential) setting, the relay is set 'ON'. Solar source START temperature set point is the solar source STOP temperature set point plus the solar source hysteresis (differential) setting.

LOGIC STEP 5: If the current vent/diffuser temperature is lower or equal to current room/interior temperature, the relay is set 'OFF'. The current vent/diffuser temperature governs the system when the heat from the solar source, having cooled through heat loss within the HVAC duct system, enters into the interior at an unacceptably lower temperature level. The vent/diffuser temperature plus the vent/diffuser hysteresis becomes a governing factor if such hysteresis is not the default (zero) as in logic step 6.

Example: Relay is Off

| Temperatures Fahrenheit Degrees | Solar Source | Vent/ Diffuser | Interior/ Room |
| --- | --- | --- | --- |
| Actual Temperature | 71 | 67 | 69 |
| Hysteresis | 2 | 0 | 2 |
| Set Point | 68 | | 74 |
| Start/Restart | 70 | 67 | 72 |

LOGIC STEP 6: If the current vent/diffuser temperature is lower or equal to the current room/interior temperature, then if the interior temperature is lower than the interior temperature set point, while the solar source temperature is higher than the vent/diffuser temperature and vent/diffuser hysteresis, the relay is set 'ON'. This step requires some sampling of the temperature variation by the user between the solar source and the vent/diffuser during early morning startup to help establish the setting or setting range as it may relate to various solar and weather conditions. Such sampling is to determine an appropriate hysteresis (differential) setting for the vent/diffuser to compensate for heat loss in the HVAC supply duct as the space heating system begins its warmup operation cycle of the day during the first intervals. This vent/diffuser hysteresis setting and the actual vent/diffuser temperature added together must still be lower than the actual solar source temperature to set the relay on. Subsequent polling of the temperatures will take place and be subject to override by logic steps 7 and 8, depending on the temperatures for the solar source and vent/diffuser and whether solar source temperature is moving higher or lower.

Example: Relay is On

| Temperatures Fahrenheit Degrees | Solar Source | Vent/ Diffuser | Interior/ Room |
| --- | --- | --- | --- |
| Actual Temperature | 71 | 67 | 69 |
| Hysteresis | 2 | 3 | 2 |
| Set Point | 68 | | 74 |
| Start/Restart | 70 | 70 | 72 |

The above example sets the relay 'ON' when the vent/diffuser temperature, although lower than the interior temperature, falls under the actual solar source temperature when adding the vent/diffuser hysteresis to the vent/diffuser temperature. The solar source set point of 20° C. (68° F.) will dictate the system relay OFF which would likely occur if the solar source temperature moves lower. If the solar source temperature is rising the relay is 'ON' and likely remains on throughout the course of the sunlight hours.

Example: Relay is Off

| Temperatures Fahrenheit Degrees | Solar Source | Vent/ Diffuser | Interior/ Room |
| --- | --- | --- | --- |
| Actual Temperature | 73 | 71 | 73 |
| Hysteresis | 2 | 3 | 2 |
| Set Point | 68 | | 74 |
| Start/Restart | 70 | 74 | 72 |

The above example causes the relay to be set OFF with the vent/diffuser temperature 21.67° C. (71° F.), now lower than the interior temperature 22.78° C. (73° F.), and higher than the actual solar source temperature when adding the vent/diffuser hysteresis of 1.67° C. (3° F.) to the current vent/diffuser temperature. The solar source set point of 20° C. (68° F.) will set the system relay OFF which likely occurs if the solar source temperature moves lower. If the solar source temperature is moving higher, the relay is 'ON' and likely remains on through the course of the sunlight hours. Logic step 7 will override the above results based on temperature level of the solar source reading during the prior interval.

LOGIC STEP 7: With the system operational and the relay 'ON', if the previous interval reading of the solar source temperature is lower than the current interval reading, the solar temperature is moving higher, which normally occurs in the morning heading to afternoon (or with weather related circumstance). Therefore, the actual vent/diffuser temperature plus the vent/diffuser hysteresis differential setting, a swing range of 0° C. to 8.33° C. (0° F. to 15° F.), must be higher than the interior temperature to activate the system relay 'ON'.

Example: Relay is ON [when Solar Source Temperature is Rising]

| Fahrenheit Degrees | Solar Source | Vent/ Diffuser | Interior/ Room | Prior Interval Solar Source Temperature |
|---|---|---|---|---|
| Actual Temperature | 74 | 70 | 71 | 71 (lower than source) |
| Hysteresis | 2 | 2 | 2 | |
| Set Point | 68 | | 74 | |
| Start/Restart | 70 | 72 | 72 | |

With the vent/diffuser likely to be lower in temperature due to HVAC duct heat loss, the vent/diffuser temperature plus vent hysteresis (differential) becomes the pacing temperature value when measured against the solar source temperature. If solar source temperature is 24.33° C. (74° F.) and vent/diffuser temperature is 21.11° C. (70° F.), while the vent/diffuser hysteresis is set at 1.11° C. (2° F.) swing, the vent/diffuser temperature as measured against the solar source temperature then causes the relay to activate 'ON' if the solar source temperature is higher.

LOGIC STEP 8: With the system operational and the relay ON during the prior interval as current solar source temperature is lower than the previous solar source temperature reading, as the current interval is completing, and while the vent/diffuser temperature is less than or equal to the present room/interior temperature, the relay is set OFF.

Example: Relay is OFF [when Solar Source Temperature is Falling]

| Fahrenheit Degrees | Solar Source | Vent/ Diffuser | Interior/ Room | Prior Interval Solar Source Temperature |
|---|---|---|---|---|
| Actual Temperature | 73 | 69 | 70 | 76 (higher than source) |
| Hysteresis | 2 | 3 | 2 | |
| Set Point | 68 | | 74 | |
| Start/Restart | 70 | 72 | 72 | |

With solar source temperature lower at the end of the latest interval, and if the vent/diffuser temperature measured against the actual current room/interior temperature is lower, the relay is set 'OFF' in compliance with the program. With this condition of solar source continuing lower in the afternoon, this condition likely persists with the relay remaining 'OFF'.

FIG. 3B is data logging conditions 1 through 5 which occurs during the interval beginning and interval ending to record temperatures/humidity and interval elapsed time readings as produced during the LOGIC steps described in FIG. 3A above. Data logging in the present invention software program occurs when certain conditions are present at the completion of each interval, in order to set the relay on or off. The data logging of current conditions also provides the information for historical results calculation, when during the interval just completed the relay is 'ON' enabling the blower to supply the solar source heated air. Writing to the SD card of such current/historical results occurs at the completion of an interval when calculated averages and operation time result are recorded using the SD writer for: (1) average solar source temperature, (2) average humidity of the solar source temperature, (3) average vent/diffuser temperature, (4) interval time in minutes. The following discusses the data conditions required within the software program that enables data logging and historical calculations using such data.

Data Logging and History Calculations

Data Condition 1: Relay is 'ON' at the End of the Current Interval, with the Previous Relay Setting Having been 'OFF'

The program does not compute temperatures and humidity average at the end of the interval, nor does it post history. This data condition would occur when the microcomputer first powers on or when the daily solar excursion begins and provides solar source temperature high enough to start the system. The current temperatures and humidity (at interval end) are now stored in a variable to be accessed for the successive interval computation.

Data Condition 2: Relay is 'ON' at the End of Current Interval with the Previous Relay Setting Having been 'ON'

The temperatures and humidity average is calculated using the beginning value and ending value of each actively 'ON' operating interval. Logging current data occurs through communication with the SD writer. The program also posts this data onto the EEPROM historical record by calculating the temperature and humidity average history and total history minutes of operation. This condition would occur when solar source heat temperature is adequate. The current temperatures and humidity (end of the interval) are now stored in a variable to be accessed for the successive interval computation.

Data Condition 3: Relay is 'OFF' in the Current Interval while the Previous Interval Relay Setting Having been 'ON'

The temperatures and humidity average is calculated using the interval beginning value and interval ending value of such current temperature/humidity. Logging current data occurs through communication with the SD writer. The program also posts this data onto the EEPROM historical record by calculating the temperature and humidity average over the history minutes of operation. This condition involves the system being off at the end of the current interval with solar source temperature now dropping to below adequate level. When this condition occurs at the end of the day, the system likely will remain off. If weather related, the system may or may not resume depending on changes in cloud cover or wind circumstance. This condition results in a reset to zero of the variable that stores previous temperature/humidity readings until during a subsequent interval the relay is again set 'ON'.

Data Condition 4: Relay is 'OFF' in the Current Interval while the Previous Relay Setting Having been 'OFF'

There is no data logging nor history recording. This would assume the system relay is off during the current interval with temperature below adequate level. This condition would continue for intervals at the end of the daily solar excursion until the next day of sunlight.

Data Condition 5: Interval Complete, Start a New Interval

Another interval begins immediately following SD posting (writing) and EEPROM historical posting, as well as when ignoring such posting under DATA CONDITIONS 1 and 4.

FIG. 4 illustrates a general form of the microprocessor, circuit board, and peripherals in isometric view showing the elements of the thermostatic controller package for fitting into a standard electric switch box. The relay may be included inside the switch box, but ordinarily is located near the air mover unit. Electric 120 Vac wiring powers an AC to DC adapter 1 (120 Vac to 9 volt direct current) to serve the microcomputer. The microcomputer 2, mounts on the circuit board 3 with electronic components and connectors to serve inputs from peripheral devices and outputs to SD writer and LCD display. The circuit board 3 includes connector blocks to enable wiring connections to peripherals (sensors, LCD, relay and rotary encoder) necessary to communicate with the microcomputer. Circuit board 3 also includes the real time clock (RTC). The SD writer/recorder 4 mounts through faceplate 5. The SD card 6 storage media chip, SDHC type, inserts into the SD writer 4 through the faceplate opening. The rotary encoder 7 (numeric input device) includes a pushbutton integrated with the rotary dial/knob for mounting on faceplate 5. The liquid crystal display (LCD) 8 (20 characters, 4 rows each) completes the package. Power on/off switch 9 energizes the 120 Vac power to the microcomputer and substitutes as a reset button.

FIG. 5A illustrates the liquid crystal display (LCD) information notifications that communicate instructions to the user necessary to perform parameter settings for temperature set points and hysteresis/differential settings. FIG. 5A displays 1 and 2 are in sequence leading to FIG. 5B menu to perform such settings. FIG. 5A periodically flashes the display for a few seconds at 30 seconds cycle time to allow the user to make changes to set points or differential settings if necessary. The LCD display reverts to the main status display screens shown on FIG. 6. FIG. 5A allows changes to occur through an interleave session during the program loop after the instructional guidance displays 1 and 2 inform the user of the opportunity to make changes during the normal loop interval process. Set points and hysteresis (differential) setting changes are generally infrequent, but the program loop enables time for such changes without disturbing the integrity of the loop interval minutes, thus allowing for changes to the set points and the hysteresis elements if necessary. If a short duration interval loop is selected (5 minutes, for example) the user can make such changes by switching (or resetting) the microcomputer off, then on, which executes a restart to allow system temperature and differential parameters to be changed should there not be enough time, if required, to make changes. Upon such restart, the program setup allows date/time, interval minutes, temperature set points and hysteresis settings without concern for the loop interval time of operation once it has commenced. The change function limits the time allowed for adjusting each set point or hysteresis even while the loop is running, but requires enough time for the program logic to make ready for relay on-off status change at interval end and to post data. The shorter interval of 5 minutes reduces the opportunity to make changes available only at the beginning of the loop due to the internal timer responding to the interval time fixed at 5 minutes; thus, the option to restart the system to make necessary changes is to accommodate user convenience.

FIG. 5B illustrates two displays in sequence to demonstrate the solar source set point menu, and the hysteresis (differential) setting menu. The numeral 3 on display 1 is the resulting change made by the user to adjust the solar stop setting from 70° F. to 68° F. using the rotary encoder. The numeral 4 on display 2 is the resulting adjustment to the solar source differential from 2° F. to 3° F. by input from the rotary encoder. FIG. 5B also relates to FIG. 6 which illustrates the primary information LCD displays showing the solar source set point and differential setting. Display 1 numeral 3 and Display 2 numeral 4 shows the temperature numeric value increment or decrement in real time as the user is making such changes using the rotary encoder. Display 2 numeral 5 is the solar start set point of 71° F., the result from the change to 3° F. now added to the 68° F. for the new current value of 71° F.

FIG. 6 illustrates two displays with display 1 showing the present hysteresis/differential settings and the interval time selected. Display 2 is the main system status that remains on during the interval process, updating every 30 seconds then pausing for use action as shown on FIG. 5A. Print line 2: 'NOW', is the current temperature status of the three temperature sensors. Print line 3: 'SET', is the current set points established by the user. The column labeled SOLAR shows SET at 68° F. having been changed from 70° F. to 68° F. as showing on display 1 of FIG. 5B. Print line 4: 'RUN', in the column labeled 'SOLAR', is the result of the solar STOP temperature set point of 68° F. plus the hysteresis (differential) setting of 3° F., the differential having been changed from 2° F. to 3° F. shown on display 2 of FIG. 5B. Print line 4 also displays the humidity reading of the solar source temperature/humidity sensor.

FIG. 7 illustrates a sequence of three LCD displays for date and time changes to the real time clock (RTC) as necessary for accurate date/time logging, including daylight savings time as in this example. Voltage changes within the microcomputer or battery failure can affect RTC accuracy. The display 1 is the initial notification during the setup period at microcomputer startup or upon restart. Date/time changes can only occur during the setup phase of operation; not during operating interval loops. Display 2 is an example using "Hour" (one of the 5 date/time settings—month, day, year, hour, and minute) instructing the user to change the hour using the rotary encoder push button to activate the change menu. Display 3 is the example of the change menu for "Hour" which shows previous hour setting of 12 modified to 11. The numeral 4 points to the LCD menu display position showing a change made upon rotating the dial counterclockwise, for a single digit click of the rotary encoder, with the display position 4 moving from 12 back to 11 o'clock. The RTC functions in the 24-hour system time standard.

FIG. 8 illustrates the liquid crystal display (LCD) screens that notify the user of the history record of hours run, average solar source temperature and humidity, and the vent/diffuser temperature over the lifetime operation of the microprocessor as the space heating system operates in the 'ON' state during operating intervals. Display 1 notification screen shows during the setup phase of the microcomputer following power-up or reset. Display 2 shows example history data starting on print line 1 with hours run since the present invention device began service. Print lines 2, 3 and 4 are historical data averages over the lifetime operation of the device. Print line 2 is the average solar source temperature. Print line 3 is the humidity average associated with the solar source average temperature. Print line 4 is the vent/diffuser average temperature. The user is able to calculate the lifetime benefit of the device using psychrometric formulas of the present invention computer application for Btu measure associated with the temperature/humidity average from the solar source heated air, when adding altitude and the blower CFM output to the equation. The vent/diffuser average temperature when compared to the solar average provides for a calculation of efficiency as a percentage to measure effectiveness of the HVAC blower and duct system. At an altitude of 1,500 feet with temperature average of 84.3 F and relative humidity average 27.4%, calculated results in 1.92 Btu per cubic foot. Calculating enthalpy for the example showing lifetime operation of 1,263.12 hours, at 400 CFM blower output would yield 582,045.7 Btu total equating to approximately 582 therms (100,000 Btu equating to 1 therm). Assuming this example is 1,263.12 hours of operation over two heating seasons, the total value at current natural gas rate of $1.25 per therm would yield $727.56 in space heating savings from the solar source heat. The example in FIG. 8 display 2 results in 95% HVAC efficiency with vent output temperature as a percentage of solar source temperature (80.1÷84.3=95%).

To conclude, the foregoing description represents elements that comprise the current invention thermostatic controller for use in solar energy space heating recommended to be a closed-loop HVAC system, and would be suitable for some solar fluid/water heating systems used for space heating or domestic/pool water heating. The teachings and disclosures used in conjunction with other thermostatic control systems known to those of ordinary skill in the art generally provide understanding of the methods employed for controlling the heating of a building. However, the present invention control of the space heating efficiency requires knowledge of environmental conditions that include solar insolation levels, coefficient of convection, specific heat of materials, outside temperature fluctuation, wind chill, relative humidity, and altitude location of the property, therefore those familiar with HVAC and solar water/fluid heating systems may require added skill and understanding of solar energy principles, as applied to space heating, in the undertaking.

Full disclosure of the present invention in the marketplace for patent effectiveness of the embodiments of the apparatus and methods employed are tantamount to the entire set of claims and embodiments of the device. The specific disclosures herein will be apparent to those skilled in the art that allows for modifications and variations made with components and methods without departing from the scope of the disclosure.

Computer Program Files

The following are Computer Program listings essential to the Specification.
Compact Disk 1 of 1 includes the following files (MS-Windows Text).
1. File Name: SOLAR_THERMOSTATIC_CONTROLLER_PROGRAM
  Date of Creation: 2016 May 14
  Size in Bytes: 192,512
File relates to patent specification Figures and Drawings illustrating the microcomputer apparatus and software program logic and processing used for thermostatic control of the present invention.
2. File Name: LIBRARY_OF_SUBROUTINES_FOR_JAVA_COMPILER
  Date of Creation: 2016 May 17
  Size in Bytes: 294,912
File relates to JAVA C++ language subroutines that support principle program item 1. above.
3. File Name: TABLE_1_BTU_CALCULATOR_FOR_DATA_LOGGER
  Date of Creation:
  Size in Bytes: 53,248
File relates to Table 1 of the Specification. Program is VBA Excel Program—Microsoft

What is claimed:
1. A thermostatic controller to manage solar energy space-heating comprising:
  microcomputer program functions to gather solar heated air from within an attic or a solar air-heating collector for supply to a building interior;
  a plurality of remotely located temperature sensors within the building or solar heat collection source to signal data to the microcomputer program to manage thermostatic control;
  electronic peripheral devices connected to the microcomputer for communicating inputs and outputs enabling software programmed execution of command parameter settings through a user interface and display of thermostatic status, and to activate on/off regulator(s) for solar space heating operation;
  a data logger communicating with a microcomputer program to collect time stamped temperature and humidity data during operation;
  a control system exclusive to collection and management of air heated by solar radiation captured within said attic or solar air-heating apparatus with such heated air conserved as a source of measurable heat energy, concentrated within such apparatus during limited daily sunlight hours, for supply by air mover(s) into a building habitable or work space through a closed loop HVAC solar heating system, whereas artificial heat created by conventional space heating apparatus is managed through an HVAC system separated from the solar air-heating HVAC system;
  an air temperature/humidity sensor located within said attic or solar air-heating collector to measure temperature and humidity, and send a signal based on that measurement;
  an air temperature sensor in communication with the supply air vent to measure temperature and send a temperature signal based on that measurement;
  an air temperature sensor in communication with the building interior habitable or working space and send a temperature signal based on that measurement.

2. The microcomputer thermostatic controller of claim 1 further comprising:
a control system to read temperature sensor signals from each of three locations: (a) solar generated heat source, (b) vent/diffuser supply outlet, (c) building interior area; with such signals initiated by a user selected timed interval parameter to govern an air mover or plurality of air movers to supply solar energy heated air for supplement space heating;
wherein the user selects the timed interval parameter to manage activation or deactivation of the air mover during sunlight hours to compensate for changes in temperature of the solar generated heat due to ambient air temperature, clouds, rain, snow, and wind;
wherein during such timed interval the air mover is activated when heat builds inside an attic or solar air-heating collector having reached a suitable temperature for space heating starting at approximately 70 F degrees;
wherein during such timed interval the air mover is deactivated when solar heated air temperature becomes unsuitable for space heating, until a subsequent timed interval event when solar heated air temperature has risen to a suitable level to activate the air mover;
wherein the timed interval is used for activation or deactivation of air mover apparatus to reduce electrical consumption and mechanical stress of such apparatus.

3. The thermostatic controller of claim 1 further comprising:
a control system employing microcomputer software to acquire current temperature readings for comparison to user selected temperature parameters;
wherein the software utilizes temperature parameters of: (i) stop temperature set point for solar source heated air, to deactivate an air mover; (ii) differential temperature set point added to said stop temperature set point, resulting in a calculated start temperature set point for solar heated air to activate (start) the air mover; (iii) differential temperature set point added to the temperature reading at the vent/diffuser, to activate or deactivate the air mover when solar source air incurs heat loss as said air flows through the supply duct; (iv) interior temperature set point, for thermostatic control of the building interior temperature relative to temperature of supplied solar heated air;
wherein a temperature differential set point ranging from 0 F to 15 F degrees applies to two separate airflow locations at which temperature signaling occurs:
(a) the solar source heated airflow, using the temperature differential set point to manage the software activation or deactivation of the air mover, primarily at daily startup, to control the solar heated air flow through a cooler HVAC supply duct, thereby to prevent heat loss affecting building interior air temperature, and
(b) the supply vent/diffuser heated airflow, using the temperature differential set point to manage the software activation or deactivation of the air mover, as solar energy fades, to avoid heat loss effect from the flowing air supplied through the vent/diffuser as such air mixes with building interior air;
wherein the differential set point from 0 F to 15 F degrees applied to: (a) solar source heated air, and (b) the supply vent diffuser, employs such software to manage conservation of solar heat energy;
whereas the differential temperature set point from 0 F to 15 F degrees is necessary to manage solar space heating due to temperature variation within the HVAC supply duct, this contrasts with differential temperature set points from 1 F to 3 F degrees used by an interior thermostat, that manages an artificial heating furnace/stove for on/off regulation, when interior temperature has fallen by the value of such differential set point.

4. The thermostatic controller of claim 1 further comprising:
a control system using temperature sensing signals from three locations;
(i) a primary sensor to detect temperature and humidity of heated air derived by solar energy that conducts through structural materials into air space of an attic or solar air-heating collector;
(ii) a secondary sensor to detect temperature of the solar heated air supply near the vent/diffuser location;
(iii) a tertiary sensor to detect temperature in the habitable interior of a building;
wherein all 3 sensor detection values result in activation/deactivation of the HVAC air mover(s) by the microcomputer program.

5. The thermostatic controller of claim 1 further comprising:
control system microcomputer software that records operational data on a secure digital high capacity card (SDHC), and on electrically erasable programmable memory (EEPROM) integrated within the microcomputer's solid-state digital memory;
wherein heat energy data of temperature and humidity is recorded at a time stamped interval, when the controller has activated an air mover to supply solar heated air, with such data processed to attain:
(i) measurement of thermodynamic variables of heat energy using temperature and humidity to calculate enthalpy, to provide the Btu measure of moist air per cubic feet of airflow related to altitude air pressure, with such heat energy measured during time of activation, in hours of operation, while the heated air is pulled from within an attic or a solar air-heating collector by the air mover during supplemental space heating;
(ii) calculation by personal computer program, or by manual calculation method, for user analysis, employing formulas applied to measured temperature and humidity data derived from HVAC industry standards using psychrometrics, to determine the cost value of the Btu energy within the solar heated air that replaces Btu equivalency of fuel required to operate a traditional heating appliance, which appliance requires less heating fuel to operate, as the solar generated heat supplants such heating fuel during periods of said supplement space heating.

6. The thermostatic controller of claim 1 further comprising:
a control system operated by microcomputer software communicating with a user interface input device and display screen for managing solar space heating prior to and during operation which purpose is to:
display printed instructions in text form directing the user in a manner of conversational and understandable language;
display such printed instruction to communicate menu items, parameter settings, and operational status information required by the user;
manage parameter settings using a multiple stop rotary switch (rotary encoder) integrated with a push button to change numeric values shown on the interface display, to avoid user required keypad or touchscreen numeric data entry error;

manage data entry of parameter settings, each of which contain a numeric range having a first to last numeric value established for such parameter that cannot be exceeded when applying the rotary switch increment/decrement entry method;

manage parameter settings without referring to a printed manual:
when required to initiate a restart of the system;
at setup up when beginning a new heating season;
after some significant time has passed since the user last was required to make changes when addressing the thermostatic controller operation;

wherein such thermostatic controller displays rudimentary alerts and instructions, without employing complicated mode settings or code structured menus that require memorizing or reading a written operating manual necessary to perform ordinary steps to set parameters for operational control of the thermostatic function.

7. A method comprising:

a control system incorporating microcomputer software to manage collection of solar generated heated air within an attic or a solar air-heating collector, either of which function as heated air containment apparatus used for supplemental space heating;

wherein air mover "on"/"off" regulation of building environmental temperature is managed by parameter set points for:

(i) temperature change within the solar heated air of the heat containment apparatus, (ii) temperature desired for the building interior, using a typical set point range of 45 F to 85 F degrees, (iii) differential temperature set point range from 0 F to 15 F degrees, as applied to temperature level of: (a) the solar source heated air, (b) the vent/diffuser heated air, (iv) interior differential temperature set point from 0 F to 3 F degrees to maintain a threshold for building interior comfort when solar heated air is the primary space heating source requiring a thermostatic control set point to manage such interior temperature;

wherein the software manages activation and deactivation of the air mover using parameter temperature set point thresholds compared to changes in solar heated air supplied into the building interior through an HVAC duct and vent/diffuser, with temperature at such vent/diffuser measured in relation to the air temperature of the building interior, while solar heated air flows by air mover into the HVAC network for supply through such vent/diffuser;

wherein a user makes adjustments as necessary to any of the parameter set points due to changes in solar energy level and weather conditions during the heating season.

8. The method of claim 7 further comprising:

a control system to capture and conserve solar heated air for supply into a building interior;

wherein the interior air temperature set point maximum of approximately 75 F degrees, within the standard temperature range for human comfort, regulates activation or deactivation of an air mover using the control system signal from a centrally located building interior temperature sensor;

wherein such set point maximum enables the solar heated air to accumulate within a building interior, for absorption into interior materials as specific heat during sunlight hours, to become a supplemental heating energy source conserved, not wasted, when solar energy is abundant and useful.

9. The method of claim 8 further comprising:

a control system to capture heat energy derived from solar insolation conducting heat through building materials, with convection transferring such heat into air for supply into a building interior during sunlight, when heated air temperature becomes suitable to activate an air mover for supplemental space heating wherein the thermal capacity of such building interior materials, as when using passive solar heating methodology, makes use of diurnal temperature variation, which effect is to release such heat by convection into the building's interior atmosphere during nighttime hours to supplement space heating.

10. The method of claim 7 further comprising:

a control system microcomputer using software to manage temperature of a building interior supplied by solar heated air;

wherein the software activates a timed interval, upon which solar source heated air temperature data is stored in digital memory of the microcomputer for comparison to such temperature data of a subsequent timed interval;

wherein the software detects the direction of change in temperature of heated air using such data comparison, to activate or deactivate an air mover;

wherein the controller activates the air mover at the timed interval as solar heated air temperature is rising, and maintains activation throughout subsequent timed intervals, while air temperature remains suitable for space heating;

wherein the controller deactivates the air mover at the timed interval, when heat energy is exhausted from solar source air to render such air to be of unsuitable temperature for space heating, with such deactivation allowing time for solar insolation to increase temperature of solar source air to a suitable level, which may occur periodically throughout the day or when the sun is lowering at the end of the day, nevertheless while the sun continues to provide sufficient solar energy.

11. The method of claim 7 further comprising:

control system microcomputer software to manage use of solar heated air supplied into a building interior, thereby allowing the effect of heat transfer into such air for use during the nighttime period of the diurnal temperature variation, to continue supplemental space heating;

whereupon whether or not the building is occupied, such method can slow heat loss from building interior air as the heat transfer continues space heating, regardless of the operational state or temperature set point of the resident artificial heating appliance during nighttime, following changes from that of the daytime temperature set point.

12. The method of claim 7 further comprising:

the control system microcomputer software employing a differential temperature degrees set point from 0 F to 15 F applicable to temperature readings of solar heated air flowing into the building interior through the vent/diffuser from the HVAC supply duct;

wherein a user inputs the differential temperature set point necessary to activate or deactivate the air mover due to changes in conditions of: (i) air mover airflow rate, (ii) HVAC duct network configuration efficiency;

wherein the user manages such conditions by adjusting HVAC configuration through addition, change or removal of air mover(s) and/or HVAC duct apparatus as necessary.

13. The method of claim 7 further comprising:

control system microcomputer software for air mover activation or deactivation in response to temperature change within the HVAC supply duct during sunlight hours of operation;

wherein the user manages the differential temperature set point from 0 F to 15 F degrees, with the controller software adding such differential temperature set point value to the present temperature value of solar heated air supplied through HVAC heating ducts while encountering conditions of: (i) lower morning temperature, (ii) lower afternoon temperature, (iii) periodic temperature change due to weather or solar conditions, (iv) air pressure due to air-friction or static pressure of HVAC apparatus;

wherein any of such conditions inhibit solar heat collection, thereby requiring such differential set point to be adjusted by the user, upon observing projection of weather changes and by examination of space heating results using the control system recorded data.

* * * * *